United States Patent [19]
Nagano et al.

[11] Patent Number: 5,646,492
[45] Date of Patent: Jul. 8, 1997

[54] ELECTRIC MOTOR CONTROLLER HAVING INDEPENDENT RESPONSES TO INSTRUCTIONS AND EXTERNAL DISTURBANCES

[75] Inventors: Tetsuaki Nagano; Seisuke Tsutsumi, both of Nagoya, Japan

[73] Assignee: Mitsubishi Denki Kabushiki Kaisha, Tokyo, Japan

[21] Appl. No.: 539,089

[22] Filed: Oct. 4, 1995

[30] Foreign Application Priority Data

Oct. 5, 1994 [JP] Japan ..................... 6-241704

[51] Int. Cl.⁶ ..................................... H02P 7/00
[52] U.S. Cl. ............................. 318/432; 318/807
[58] Field of Search ................. 318/432, 798–815, 318/561, 609, 610, 611, 623

[56] References Cited

U.S. PATENT DOCUMENTS

| | | | |
|---|---|---|---|
| 4,587,469 | 5/1986 | Ikebe et al. | 318/432 |
| 5,223,775 | 6/1993 | Mongeau | 318/432 |
| 5,444,341 | 8/1995 | Kneifel, II et al. | 318/432 |
| 5,467,004 | 11/1995 | Matsuo et al. | 318/807 |
| 5,481,168 | 1/1996 | Mutoh et al. | 318/432 |
| 5,493,192 | 2/1996 | Nihei et al. | 318/432 X |

FOREIGN PATENT DOCUMENTS

| | | |
|---|---|---|
| 61-290505 | 12/1986 | Japan . |
| 62-9404 | 1/1987 | Japan . |
| 63-101902 | 5/1988 | Japan . |
| 3-15911 | 1/1991 | Japan . |
| 3-107384 | 5/1991 | Japan . |
| 5-91774 | 4/1993 | Japan . |
| 6-30577 | 2/1994 | Japan . |
| 6-30578 | 2/1994 | Japan . |

*Primary Examiner*—Jonathan Wysocki
*Attorney, Agent, or Firm*—Sughrue, Mion, Zinn, Macpeak & Seas

[57] ABSTRACT

A controller for an electric motor, wherein a differential signal for a speed instruction signal is obtained by a differential circuit, a control signal is obtained by a first speed control circuit, and both signals are summed to obtain a first torque signal. A simulated speed signal is obtained from the first torque signal by a torque simulating circuit and a mechanical system simulating circuit. A second torque signal is obtained by a second speed control circuit. The first and second torque signals are summed by an adder to obtain a torque instruction signal, and the electric motor is controlled so that the generated torque follows the torque instruction signal.

19 Claims, 38 Drawing Sheets

EXTERNAL DISTURBANCE TORQUE

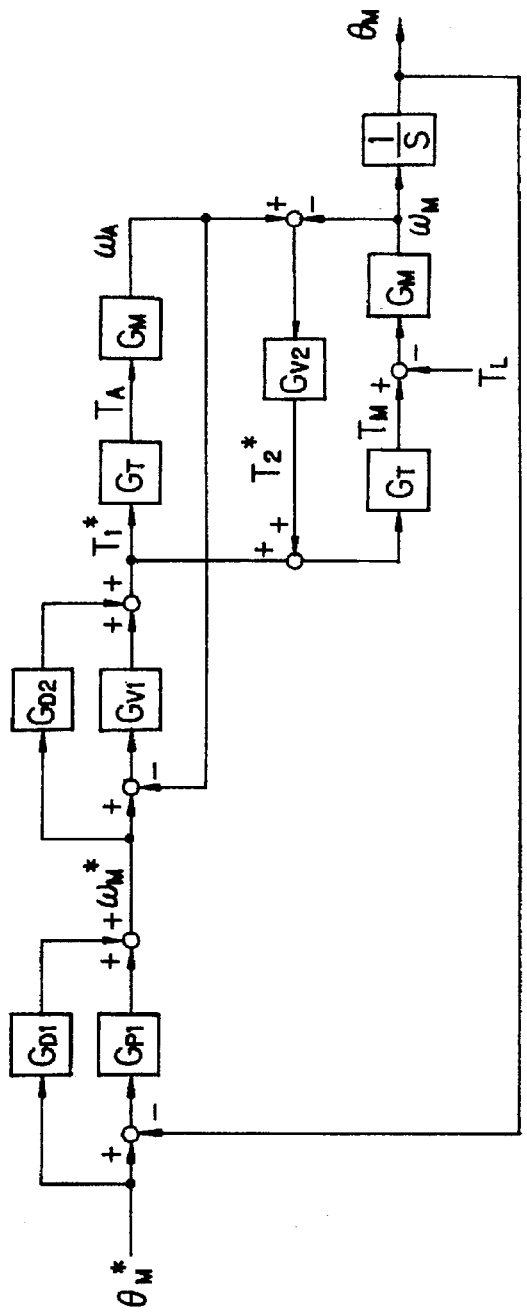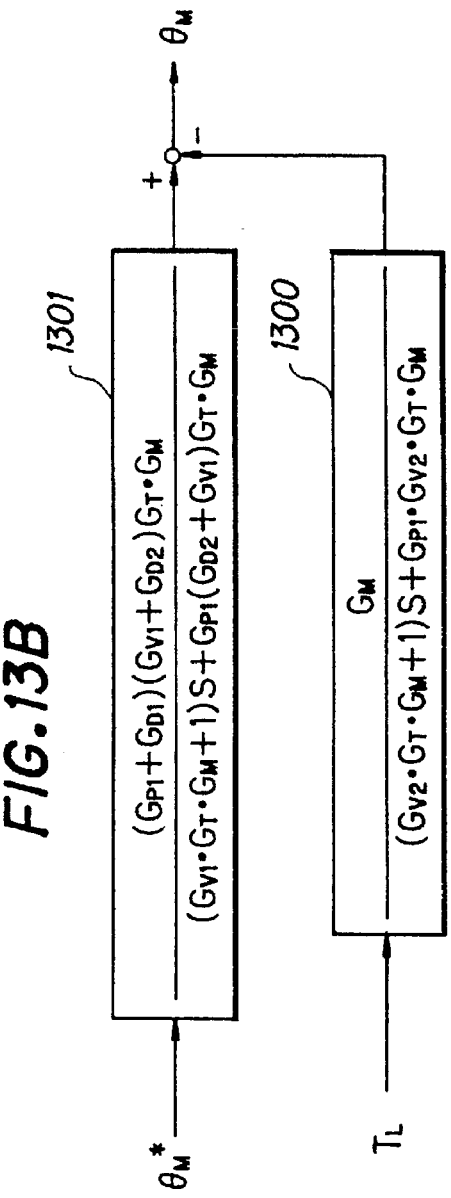
FIG.13A
FIG.13B

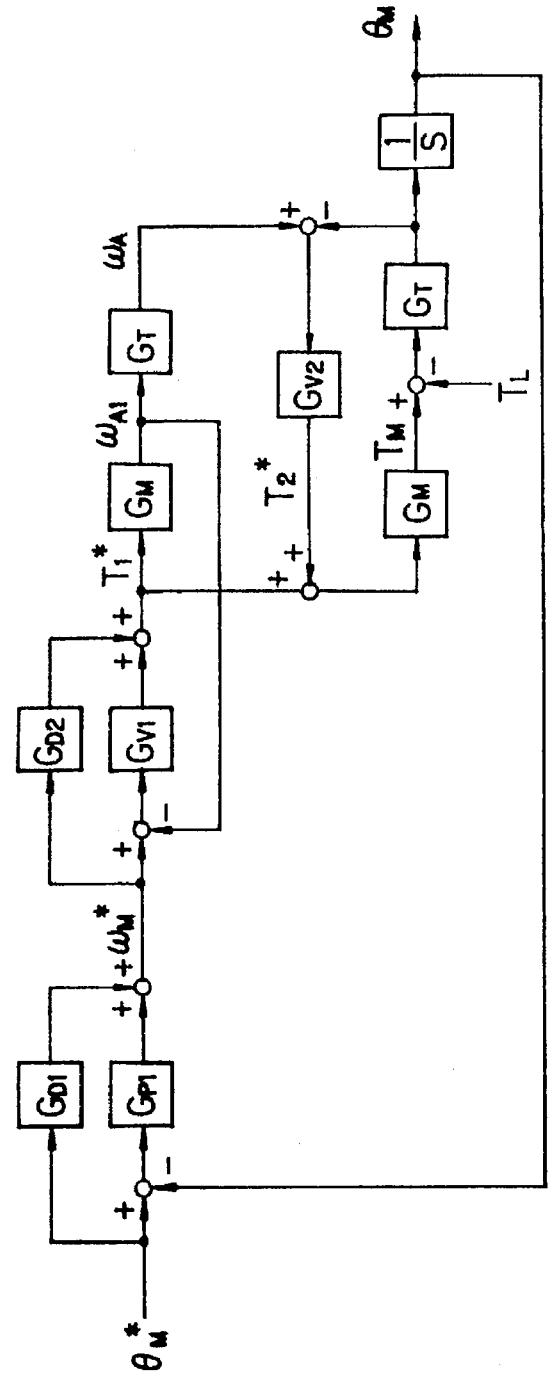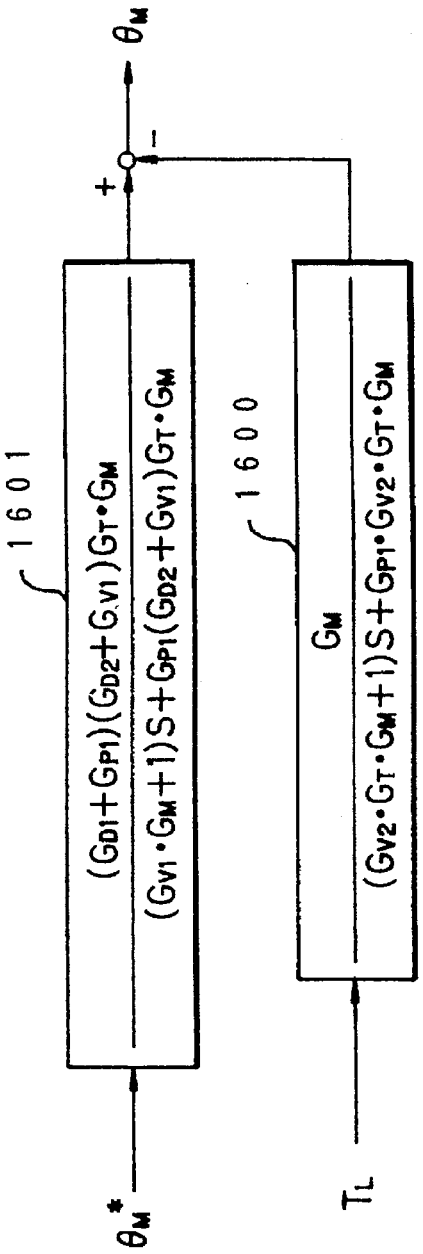
FIG.16A
FIG.16B

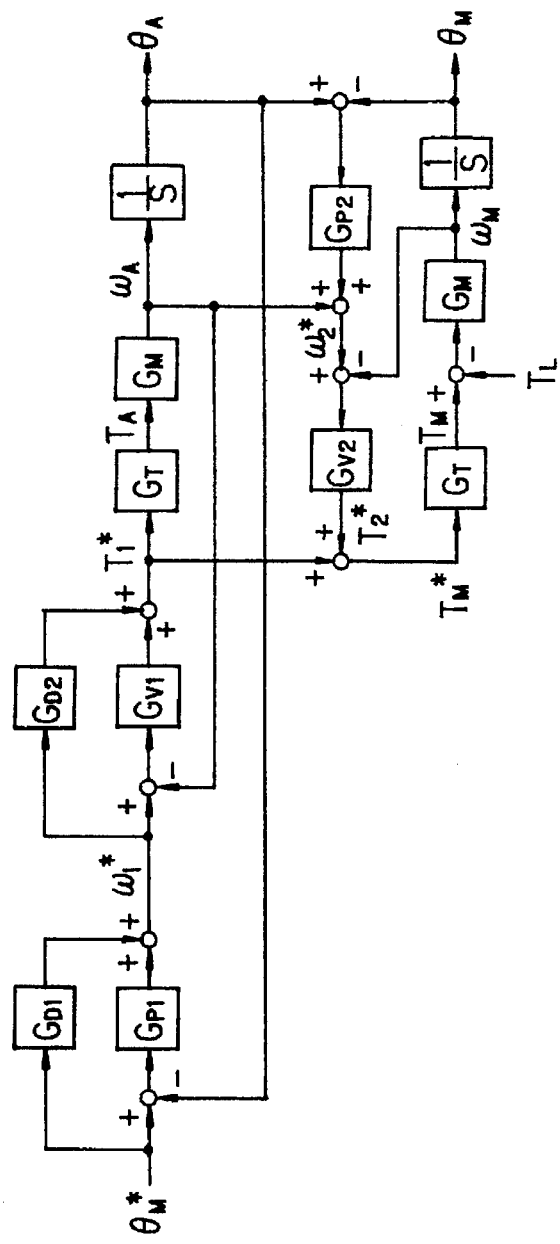
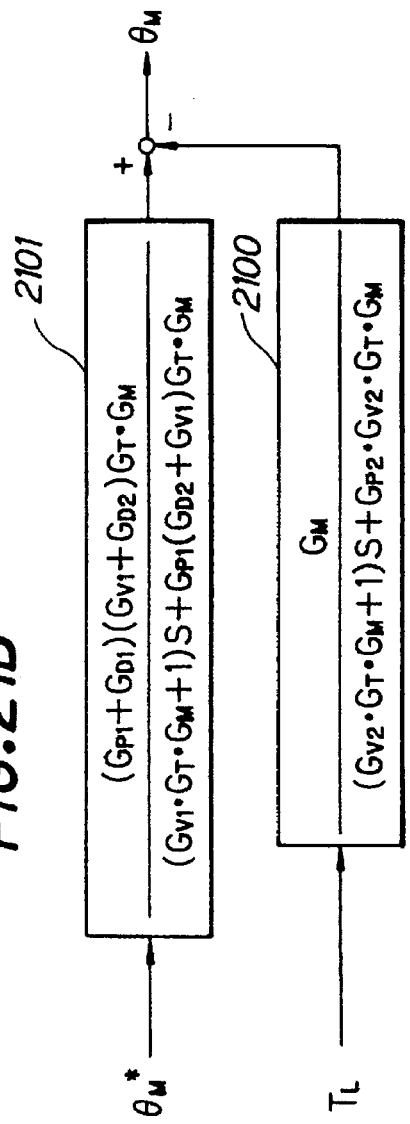
FIG.21A
FIG.21B

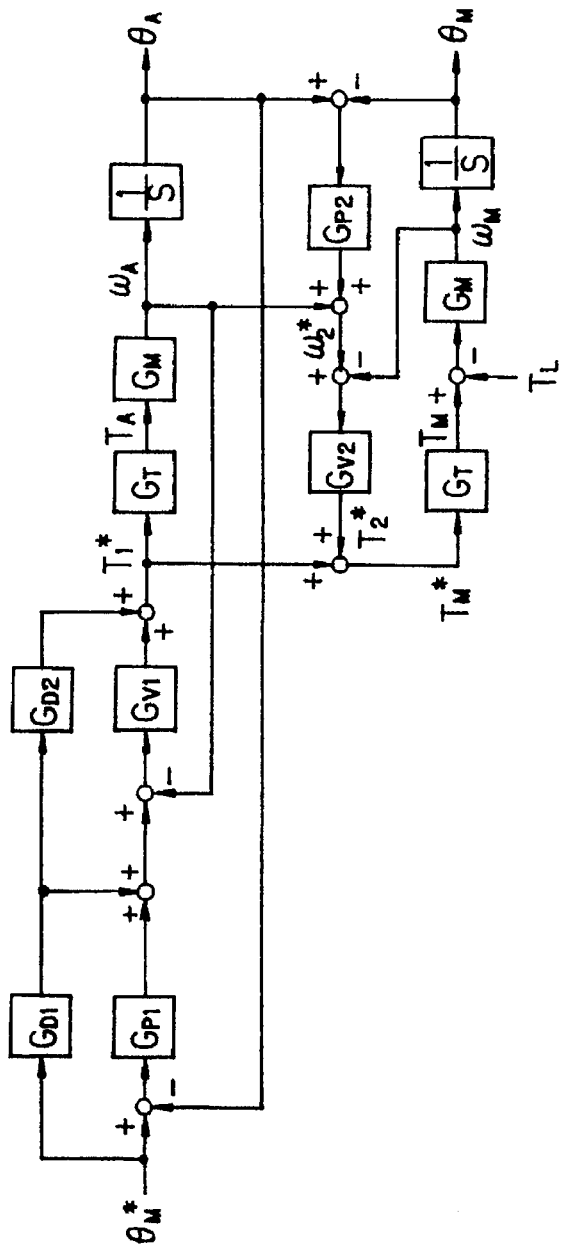
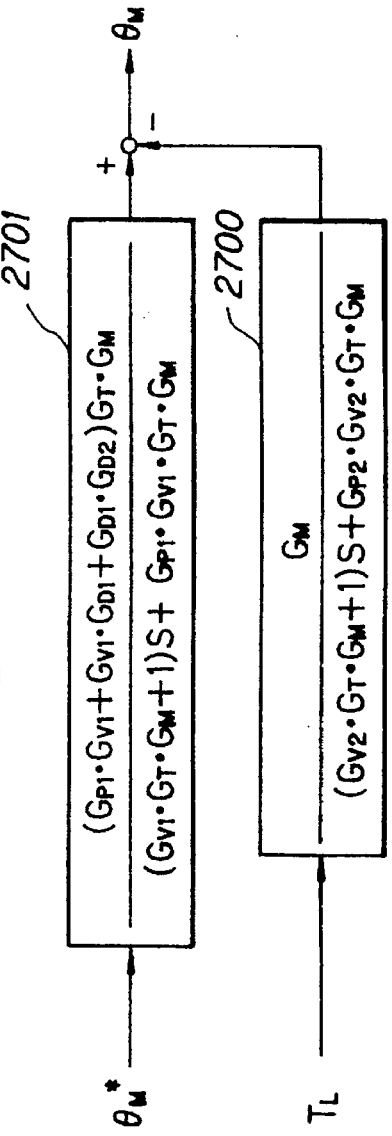
FIG. 27A
FIG. 27B

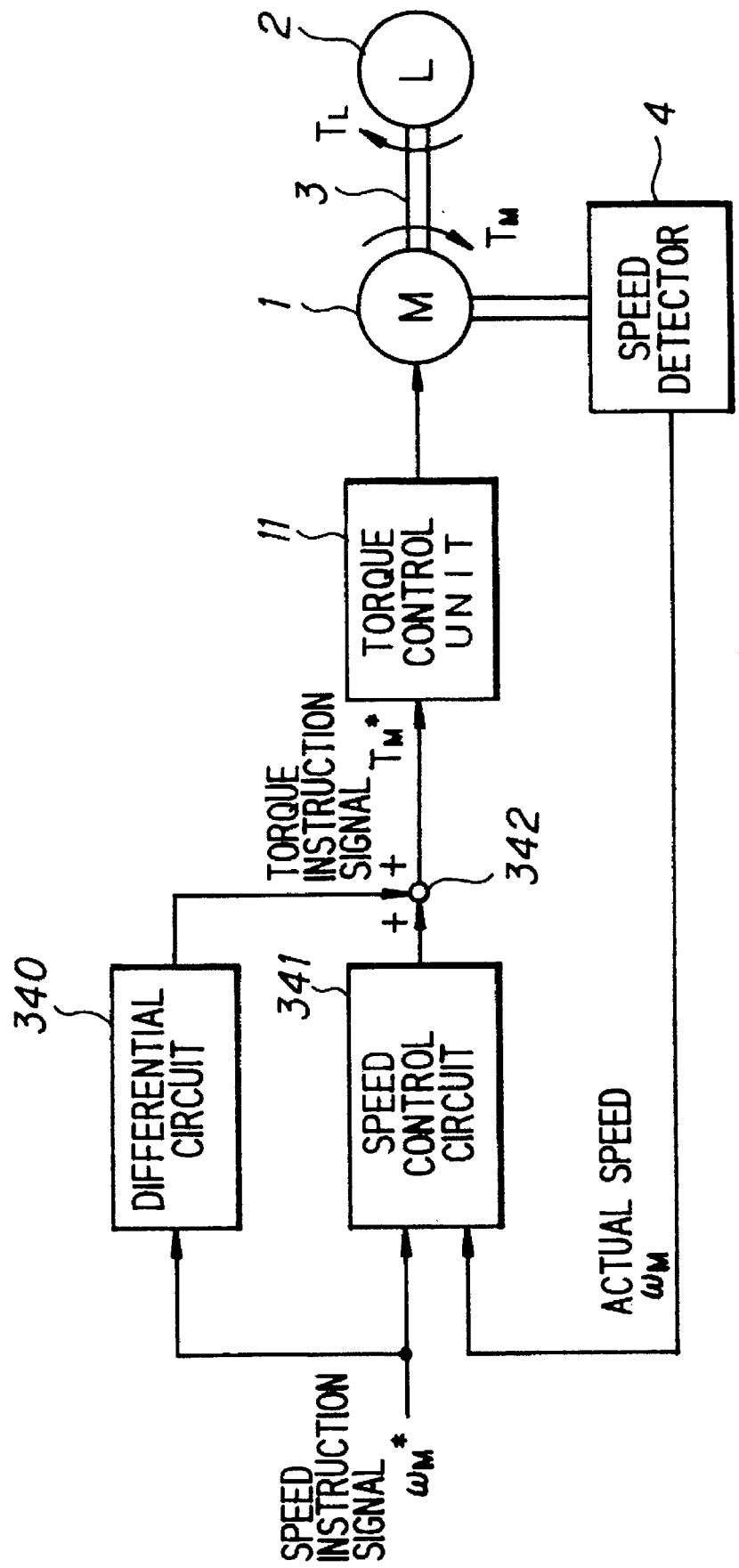

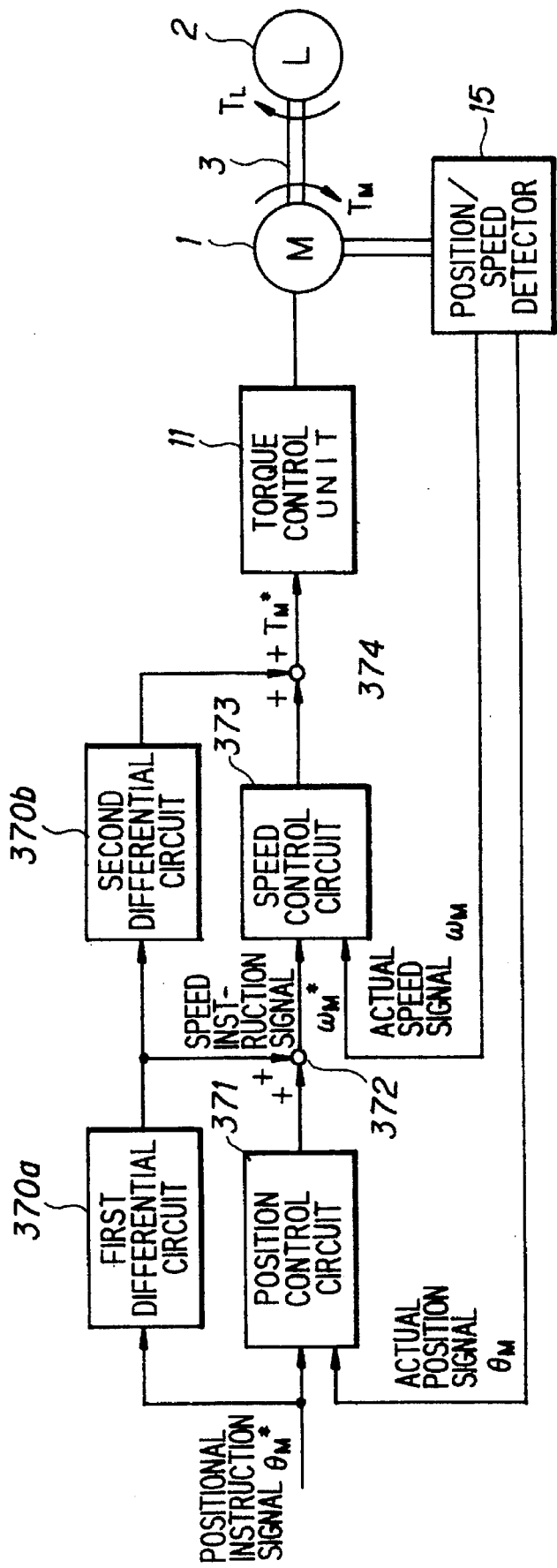

ELECTRIC MOTOR CONTROLLER HAVING INDEPENDENT RESPONSES TO INSTRUCTIONS AND EXTERNAL DISTURBANCES

FIELD OF THE INVENTION

The present invention relates to a controller for an electric motor for controlling the rotational speed or position of an electric motor which drives a load machine. More particularly, the invention relates to a controller for an electric motor in which responses to instructions and external disturbances can be set independently and which therefore allows simultaneous improvement of the two types of response.

BACKGROUND OF THE INVENTION

In control of an electric motor, generally, the motor's response with respect to a target value and to an external disturbance are important factors. Namely, it is required that an electric motor respond to instruction values concerning the rotational speed and position of the motor as quickly and stably as possible while external disturbances produce as little effect as possible.

For this purpose, there has been proposed a controller for an electric motor which allows improvement of response by adding a feed-forward control signal, which corresponds to changes in an instruction value and which is obtained by integrating an instruction value, to a feedback control signal corresponding to the amount of deviation between instruction and feedback values and applying the sum as a new control signal. Examples of this type of controller for an electric motor include the motor drive controller disclosed in Japanese Patent Laid-Open Publication No. 107384/1991 and the feed-forward control system for a servo motor disclosed in Japanese Patent Laid Open Publication No. 15911/1991.

However, in the conventional controller for an electric motor, the target value response and external disturbance response cannot be set independently, and if a control system is designed with emphasis on the target value response, the external disturbance response becomes lower, and if a control system is designed with emphasis on the external disturbance response, the target value response becomes lower.

Furthermore, as a feed-forward control signal is obtained by integrating an instruction value, sometimes an excessive feed-forward control signal is generated resulting in an instruction value having an excessive amplitude. As a result, the rotational speed of the motor may be set higher than the allowable speed for the associated torque transfer mechanism or the load machine, or the output torque may be made higher than the allowable torque, causing damage to the load machine.

A detailed description of this effect will hereinafter be given with reference to FIGS. 33 to 43. It should be noted that, in these figures, like reference numerals are assigned to like components.

FIG. 33 shows the general configuration of a conventional rotational speed controller for an electric motor, as disclosed in Japanese Patent Laid-Open Publication No. 91774/1993. In this figure, designated at reference numeral 1 is an electric motor, at 2 a load machine, at 3 a torque transfer mechanism coupled between the electric motor 1 and the load machine 2, at 4 a rotational speed detector for detecting the rotational speed of the electric motor 1, at 340 a differential circuit for differentiating a speed instruction $\omega_M^*$ and outputting a feed-forward control signal, at 341 a rotational speed control circuit for comparing the speed instruction $\omega_M^*$ to the actual rotational speed $\omega_M$ of the electric motor detected by the rotational speed detector 4, at 342 an adder for adding the output from the rotational speed control circuit 341 to the output from the differential circuit 340 and outputting a torque instruction $T_M^*$, and at 11 a torque control unit for controlling the torque $T_M$ of the electric motor 1 in response to the torque instruction $T_M^*$.

Next a description will be provided of operations conventional rotational speed controller. FIG. 34A is a block diagram showing the rotational speed controller of FIG. 33, wherein $G_D$ is the transmittance of the integration circuit 340 shown in FIG. 33, $G_V$ is the transmittance of the rotational speed control circuit 341, $G_T$ is the transmittance from the torque instruction signal $T_M^*$ to the torque $T_M$ of the electric motor 1, and $G_M$ is the transmittance from the torque $T_M$ to the rotational speed $\omega_M$.

FIG. 34B is a block diagram in which the configuration shown in FIG. 34A is expressed as a transmittance block for the rotational speed instruction $\omega_M^*$ and a transmittance block for the external disturbance torque $T_L$ each separated from the other. In this figure, as the only variable parameter in the transmittance block 350 from the external disturbance torque $T_L$ up to the rotational speed $\omega_M$ is $G_V$, it can be understood that the external disturbance response is determined by only $G_V$. Also a high target value response can be achieved by arranging the transmittance function block 351 from the rotational speed instruction $\omega_M^*$ to the rotational speed $\omega_M$ as a stable polar arrangement with offsetting poles having a low response at a zero point. In this case, the polar arrangement is determined by $G_V$, and the arrangement of the zero points is determined by $G_D$ and $G_V$. For this reason, if the external disturbance response is changed by adjusting $G_V$, the conditions for pole/zero point offsetting in the transmittance block 351 are lost, which may in turn result in overshooting the target value response or may make the response unstable.

Next, what is described above can be verified by means of simulation. For that purpose, at first the transmittance $G_T$ of a torque control unit 11 is obtained. Generally, the torque of an electric motor is controlled by the current in the electric motor, and an embodiment of the torque control unit 11 is shown in FIG. 35. In this figure, designated at reference numeral 330 is a coefficient multiplier for converting a torque instruction $T_M^*$ to a current instruction $I_M^*$ by multiplying it by the inverse of the torque constant $K_T$, at 331 a current detector for detecting the current $I_M$ in the electric motor 1, and at 332 a current control circuit for applying to the electric motor 1 a voltage V determined in such a manner that the current in the electric motor 1 follows the current instruction $I_M^*$.

Next, a description will be provided of operations thereof. The transmittance ($I_M/I_M^*$) of a current control system composed of the current detector 331, current control circuit 332, and electric motor 1 is designed so that a first time lag is realized. Furthermore, as the torque $T_M$ is in proportion to the current $I_M$, the transmittance $G_T$ of the torque control unit 11 is expressed as a first time lag of expression (1) below (See, for instance, "Theory for Servo System and Actual Designing", pp. 80 to 85, and pp. 153 to 155, 1990, Sogo Denshi Shuppan). It should be noted that s is a complex operator, while $\omega_{CC}$ is the response frequency of the current control system.

$$G_T = \frac{T_M}{T_M^*} = \frac{1}{1 + s/\omega_{CC}} \quad (1)$$

The transmittance $G_M$ from the torque $T_M$ to the rotational speed $\omega_M$ is obtained. Assuming that the sum of inertia of the electric motor 1, that of the load machine 2, and that of the torque transfer mechanism 3 is J, $G_M$ is expressed by expression (2) below.

$$G_M = \frac{1}{Js} \quad (2)$$

Furthermore it is assumed herein that the transmittance $G_V$ of the rotational speed control circuit and the transmittance $G_D$ of the differential circuit are as defined by expressions (3) and (4) below, respectively.

$$G_V = K_V + \frac{K_I}{s} \quad (3)$$

$$G_D = \alpha_V s \quad (4)$$

With the transmittances expressed by expressions (1) to (4) above, if the gains $K_V$ and $\alpha_V$ are set as indicated by expressions (5) and (6) below, respectively, it is possible to realize a speed control system in which the step response does not overshoot because of pole/zero offsetting and the highest response is insured.

$$K_V = \frac{J \cdot \omega_{CC}}{4} \quad (5)$$

$$\alpha_V = \frac{J}{2} \quad (6)$$

In this case, the transmittance from the speed instruction $\omega_M^*$ to the rotational speed $\omega_M$ of the electric motor is as expressed by expression (7) below, while the maximum target value response is $\omega_{CC}/2$, namely one-half of the response of the current control system.

$$\frac{\omega_M}{\omega_M^*} = \frac{1}{1 + 2s/\omega_{CC}} \quad (7)$$

FIG. 36 to FIG. 37 show the results of simulation in a case where a speed instruction $\omega_M^*$ with a scale 1 is applied in step fashion and then, in the middle portion of the graph, an external disturbance with a load of scale 40 applied. Herein, J is 1 and $\omega_{CC}$ is 2000. FIG. 36 shows the case where $K_V$ is set to 500, $K_I$ to 0, and $\alpha_V$ to 0.5, respectively, according to expressions (5) and (6). FIG. 37 shows a response waveform in the case where $K_V$ is set to 1000 (twice the value in FIG. 36) to improve the external torque response. The latter figure shows that the speed effect due to the external disturbance torque is reduced and the external disturbance response is improved, but overshooting occurs and the target value response becomes lower. Furthermore, FIG. 38 shows the response in a case where the integration gain $K_I$ is set to $10^5$ to eliminate a steady-state error due to the external disturbance torque. This figure shows that the steady-state error is eliminated, but overshooting occurs with the target value response deteriorated.

For this reason, it is understood that in the conventional speed controller as shown in FIG. 33 the target value response and external disturbance response cannot be set independently, and that, if the external response is raised, the target value response is deteriorated.

In the conventional speed controller for an electric motor as shown in FIG. 33, the torque $T_M$ generated by the electric motor 1 is restricted by the relation between a mechanical strength of the torque transfer mechanism 3 and that of the load machine 2, and if a speed instruction signal $\omega_M^*$ having a large amplitude is inputted, a signal for an excessive torque is outputted from the differential circuit 340, a torque instruction $T_M^*$ at a level higher than that allowable in relation to the mechanical strength of the torque transfer mechanism 3 and that of the load machine 2 is generated, and sometimes an excessive torque and vibration are generated, while in some cases the machine may even be severely damaged.

FIG. 39 shows the general configuration of a position controller for an electric motor based on the conventional controller and disclosed in Japanese Patent Laid-Open Publication No. 15911/1991. In FIG. 39, designated at reference numeral 15 is a position/speed detector for detecting the position and rotational speed of an electric motor and outputting an actual speed instruction $\omega_M$ and actual position signal $\theta_M$, at 370a a first differential circuit for differentiating a positional instruction $\theta_M^*$ provided from the outside and outputting a feed-forward control signal, at 371 a position controller for comparing the positional instruction $\theta_M^*$ to the actual position $\theta_M$ and outputting a feedback control signal for reducing the error, at 372 an adder for summing the output from the first differential circuit 370a and the output from the position control circuit 371 and outputting a speed instruction signal $\omega_M^*$, at 370b a second differential circuit for differentiating the output from the first differential circuit and outputting a feed-forward control signal, and at 373 a speed control circuit for comparing the speed instruction signal $\omega_M^*$ to the actual rotational speed $\omega_M$ and outputting a control signal for reducing the error.

Next, a description will be provided of operations thereof. A detailed description is made with reference to FIG. 40A to FIG. 43. FIG. 40A is a block diagram showing the position controller of FIG. 39, wherein $G_{D1}$ is the transmittance of the first differential circuit 370a in FIG. 39, $G_P$ is the transmittance of the position control circuit 371 in the same figure, $G_{D2}$ is the transmittance of the second differential circuit 370b in the same figure, $G_V$ is the transmittance of the speed control circuit 373, $G_T$ is the transmittance from the torque instruction signal $T_M^*$ to the torque $T_M$ of the electric motor 1, and $G_M$ is the transmittance from the torque $T_M$ to the speed $\omega_M$.

FIG. 40B is a block diagram expressed with the transmittance block to the positional instruction $F_M^*$ in FIG. 40A and the transmittance block to the external disturbance torque $T_L$, each shown in FIG. 40A and separated herein from each other. In this figure, it is understood that, as variable factors in the transfer block 380 from the external disturbance torque $T_L$ to the position $\theta_M$ are $G_P$ and $G_V$, the external disturbance response is determined by $G_P$ and $G_V$. To improve the external disturbance response, the denominator in the transmittance block 380 is required to be made larger, but $G_V$ is included in the $s^1$ and $s^0$ terms in the denominator while $G_P$ is included in the $S^0$ term but is not included in the $S^1$ term, and for this reason it is understood that it is more effective to make $G_V$ larger to improve the external disturbance response.

An improved target response can be obtained by arranging the transmittance block 381 between the positional instruction $\theta_M^*$ and the position $\theta_M$ as a stable polar arrangement and offsetting the poles with a slow response among the poles at a zero point. In that case, the polar arrangement is determined by $G_P$ and $G_V$, while the arrangement of the zero points is determined by $G_{D1}$, $G_{D2}$, $G_P$ and $G_V$. For this reason, for instance, when the external disturbance response is changed by adjusting $G_V$, the conditions for pole/zero offsetting in the transmittance block 381 are lost and sometimes overshooting may occur or the transmittance may become unstable.

What is described above may be verified through simulation. First, it is assumed that $G_T$ and $G_M$ are expressed by expressions (1) and (2) above. Also, it is assumed herein that $G_P$ and $G_V$ are expressed by expressions (8) to (11) below.

$$G_{D1} = \alpha_P s \tag{8}$$

$$G_{D2} = \alpha_V s \tag{9}$$

$$G_P = K_P \tag{10}$$

$$G_V = K_V \tag{11}$$

In the case where each transmittance is expressed by expressions (1) and (2) and expressions (8) to (11), if the individual gains are set as expressed by the following expressions (12) to (15), respectively, overshooting does not occur because of pole/zero offsetting, and a position control system insuring the highest response can be realized.

$$K_P = \frac{\omega_{CC}}{4} \tag{12}$$

$$K_V = \frac{J \cdot \omega_{CC}}{2} \tag{13}$$

$$\alpha_P = \frac{1}{2} \tag{14}$$

$$\alpha_V = J \tag{15}$$

In this case, the transmittance from the positional instruction $\theta_M^*$ to the position $\theta_M$ of the electric motor 1 is as expressed by expression (16) below, and the maximum target response is $\omega_{CC}/2$, namely, half of the response of the current control system.

$$\frac{\theta_M}{\theta_M^*} = \frac{1}{1 + 2s/\omega_{CC}} \tag{16}$$

FIG. 41 to FIG. 43 show the result of simulation in a case where a positional instruction $\theta_M^*$ with a scale 1 is applied in step form and an external disturbance torque $T_M$ with a scale of 2×10$^4$ is applied starting from the middle portion of the graph. Herein J is 1 and $\omega_{CC}$ is 2000. FIG. 41 shows the response in a case where $K_P$ is set to 500, $K_I$ to 0, $\alpha_P$ to 0.5, and $\alpha_V$ to 1 according to expressions (12) to (15), respectively, while FIG. 42 shows a response in a case where $K_V$ is set to 2000 (twice that in FIG. 41) to improve the external disturbance response. In FIG. 42, the positional error due to external disturbance torque is smaller and the external response characteristic is improved, but the response shows an initial instability and the target response is deteriorated. FIG. 43 shows the response in a case where an integral gain $K_I$ in the speed control circuit is set to 2×10$^5$ to eliminate steady-state error due to an external disturbance torque. In this case, the steady-state error is eliminated, but overshooting occurs and the target value response is deteriorated. For this reason, in the conventional position controller shown in FIG. 39, the target value response cannot be set independently, and if the external disturbance response is raised, the target value response is deteriorated.

Also in FIG. 39, the rotational speed $\omega_M$ and generated torque $T_M$ in the electric motor 1 are restricted by such factors as the relation between the mechanical strength of the torque transfer mechanism 3 and that of the load machine 2. If a positional instruction signal $\theta_M^*$ having a large amplitude is inputted, a signal at an excessive level is outputted from the first differential circuit 370a, and sometimes a speed instruction signal $\omega_M^*$ at a level higher than that allowable for the mechanical system or a signal at an excessive level is outputted from the second differential circuit 370b and a torque instruction $T_M^*$ at a level higher than that allowable for the mechanical system, and as a result damage may be caused to the mechanical system.

For further background information, reference can be made to Japanese Patent Laid-Open Publication No. 101902/1988 disclosing a control unit, Japanese Patent Laid-Open Publication No. 9404/1987 disclosing a process control unit, Japanese Patent Laid-Open Publication No. 30577/1994 disclosing a speed control unit for an electric motor, Japanese Patent Laid-Open Publication No. 30578/1994 disclosing a position control unit for an electric motor, and Japanese Patent Laid-Open Publication No. 290505/1986 disclosing a process control unit.

As described above, in the conventional controller, there is the problem that the external disturbance response and the target value response cannot be set independently, and especially if it is tried to improve the external disturbance response, the target value response is deteriorated. Also, in a case where an instruction signal having a large amplitude is inputted, as the amplitude of an output from the differential circuit is not restricted, a speed instruction signal or a torque instruction signal at a level higher than that allowable for the machine are generated, which may in turn cause damage to the machine.

SUMMARY OF THE INVENTION

It is an object of the present invention to provide a controller for an electric motor which can improve the target value response and the external disturbance response independently and does not cause damage to the machine, even in a case where an instruction having a large amplitude is inputted.

In the controller for an electric motor according to the present invention, a differentiating means receives a speed instruction inputted thereto and outputs a differential signal, a first speed control means receives the differential signal, the speed instruction signal, and a simulated speed signal each inputted thereto, and outputs a first torque signal so that the simulated speed signal follows the speed instruction signal. A torque response simulating means receives the first torque signal inputted thereto and outputs a simulated torque signal, and a mechanical system simulating means receives the simulated torque signal inputted thereto and outputs a simulated speed signal. A second speed control means receives the simulated speed signal and an actual speed signal each inputted thereto and outputs a second torque signal so that the actual speed signal follows the simulated speed signal. An adding means sums the first torque signal and the second torque signal and outputs a torque instruction signal, while a torque control unit controls the torque of the electric motor according to the torque instruction signal.

In the controller for an electric motor according to the present invention, a differentiating means receives a speed instruction signal inputted thereto and outputs a differential signal, a first speed control means receives the differential signal, the speed instruction signal, and a first simulated speed signal each inputted thereto and outputs a first torque signal so that the first simulated speed signal follows the speed instruction signal. A mechanical system simulating means receives the first torque signal inputted thereto and outputs a first simulated speed signal, and a torque response simulating means receives the first simulated speed signal and outputs a second simulated speed signal. A second speed control means receives the second simulated speed signal and an actual speed signal and outputs a second torque signal so that the actual speed signal follows the second simulated speed signal. An adding means sums the first torque signal and the second torque signal and outputs a torque instruction signal, and a torque control unit controls the torque of the electric motor according to the torque instruction signal.

In a controller for an electric motor according to the present invention, a first differential means receives a positional instruction signal inputted thereto and outputs a first differential signal, and a first position control means receives the first differential signal, the positional instruction signal, and an actual position signal each inputted thereto and outputs a speed instruction signal so that the actual position signal follows the positional instruction signal. A second differential means receives the speed instruction signal inputted thereto and outputs a second differential signal, a first speed control means receives the second differential signal, the speed instruction signal, and a simulated speed signal each inputted thereto and outputs a first torque signal so that the simulated speed signal follows the speed instruction signal. A torque response simulating means receives the first torque signal inputted thereto and outputs simulated torque signal, and a mechanical signal simulating means receives the simulated torque signal and outputs a simulated speed signal. A second speed control means receives the simulated speed signal and an actual speed signal and outputs a second torque signal so that the actual position signal follows the simulated speed signal. An adding means sums the first torque signal and the second torque signal and outputs a torque instruction signal, and a torque control unit controls the torque of the electric motor according to the torque instruction signal.

In a controller for an electric motor according to the present invention, a first differentiating means receives a positional instruction signal inputted thereto and outputs a first differential signal, and a first position control means receives the first differential signal, a positional instruction signal, and an actual position signal each inputted thereto and outputs a speed instruction signal so that the actual position signal follow the positional instruction signal. A second differentiating means receives the speed instruction signal inputted thereto and outputs a second differential signal, a first speed control means receives the second differential signal, the speed instruction signal, and a first simulated speed signal each inputted thereto and outputs a first torque signal so that the first simulated speed signal follows the speed instruction signal. A mechanical system simulating means receives the first torque signal inputted thereto and outputs a first simulated speed signal, a torque response simulating means receives the first simulated speed signal inputted thereto and outputs a second simulated speed signal. A second speed control means receives the second speed signal and an actual speed signal inputted thereto and outputs a second torque signal so that the said actual speed signal follows the second simulated speed signal. An adding means sums the first torque signal and the second torque signal and outputs a torque instruction signal, and a torque control unit controls the torque of the electric motor according to the torque instruction signal.

In a controller for an electric motor according to the present invention, a first differentiating means receives a positional instruction signal inputted thereto and outputs a first differential signal, a first position control means receives the positional instruction signal and a simulated position signal each inputted thereto and outputs a first speed instruction signal so that the simulated position signal follows the positional instruction signal. A second differentiating means receives the speed instruction signal inputted thereto and outputs a second differential signal, and a first speed control means receives the second differential signal and the first speed instruction signal each inputted thereto and outputs a first torque signal so that the simulated speed signal follows the speed instruction signal. A torque response simulating means receives the first torque signal inputted thereto and outputs a simulated torque signal, and a mechanical system simulating means receives the simulated torque signal inputted thereto and outputs a simulated position signal. A second position control means receives the simulated position signal and an actual position signal inputted thereto and outputs a speed signal so that the actual position signal follows the simulated position signal, and a first adding means sums the speed signal and the simulated speed signal and outputs a second speed instruction signal. A second speed control means receives the second speed instruction signal and an actual speed signal inputted thereto and outputs a second torque signal so that the actual speed signal follows the second speed instruction signal. A second adding means sums the first torque signal and the second torque signal and output a torque instruction signal, and a torque control unit controls the torque of an electric motor according to the torque instruction signal.

In a controller for an electric motor according to the present invention, a first differentiating means receives a positional instruction signal inputted thereto and outputs a first differential signal, a first position control means receives the first differential signal, the positional instruction signal, and an actual position signal each inputted thereto, and outputs a speed instruction signal so that the actual position signal follows the positional instruction signal. A second differentiating means receives the first differential signal inputted thereto and outputs a second differential signal, a first speed control means receives the second differential signal, the speed instruction signal, and a simulated speed signal and outputs a first torque signal so that the simulated speed signal follows the speed instruction signal. A torque response simulating means receives the first torque signal inputted thereto and outputs a simulated torque signal, and a mechanical system simulating means receives the simulated torque signal inputted thereto and outputs a simulated speed signal. A second speed control means receives the simulated speed signal and an actual speed signal each inputted thereto and outputs a torque signal so that the actual position signal follows the simulated speed signal. An adding means sums the first torque signal and the second torque signal and outputs a torque instruction signal, and a torque control unit controls the torque of the electric motor according to the torque instruction signal.

In a controller for an electric motor, a first differentiating means receives a positional instruction signal inputted thereto and outputs a first differential signal, a first position control means receives the first differential signal, the positional instruction signal, and a simulated position signal each inputted thereto and outputs a first speed instruction signal so that the simulated position signal follows the positional instruction signal. A second differentiating means receives the first differential signal inputted thereto and outputs a second differential signal, and a first speed control means receives the second differential signal, the speed instruction signal, and a simulated speed signal each inputted thereto and outputs a firs torque so that the simulated speed signal follows the first speed instruction signal. A torque response simulating means receives the first torque signal inputted thereto and outputs a simulated torque signal, and a mechanical simulating means receives the simulated torque signal inputted thereto and outputs a simulated speed signal and a simulated position signal. A second position control means receives the simulated position signal and an actual position signal each inputted thereto and outputs a speed signal so that the actual position signal follows the simulated position signal, and a first adding means sums the speed signal and the simulated speed signal and outputs a second speed instruction signal. A second speed control means receives the second speed instruction signal and an actual speed signal each inputted thereto and outputs a second torque signal so that the actual speed signal follows the second speed instruction signal. A second adding means sums the first torque signal and the second torque signal and outputs a torque instruction signal, and a torque control unit controls the torque of the electric motor according to the torque instruction signal.

In a controller for an electric motor according to the present invention, a signal control means limits the amplitude of a differential signal inputted to a speed control means to less than a specified amplitude value.

In a controller for an electric motor according to the present invention, a signal control means limits the amplitude of a differential signal inputted to a speed control means to less than a specified amplitude value.

Other objects and features of this invention will become understood from the following description with reference to the accompanying drawings.

BRIEF DESCRIPTION OF THE DRAWINGS

FIGS. 13A and 13B are block diagrams showing operations in Embodiment 3;

FIGS. 16A and 16B are block diagrams showing operations in Embodiment 4;

FIGS. 21A and 21B are block diagrams showing operations in Embodiment 5;

FIGS. 27A and 27B are block diagrams showing operations in Embodiment 7;

FIG. 33 is a block diagram showing the configuration of a conventional controller for an electric motor;

FIG. 39 is a block diagram showing another configuration of a conventional position controller for an electric motor;

DESCRIPTION OF THE PREFERRED EMBODIMENTS

Embodiment 1

A description will be given hereinafter of various embodiments of a controller for an electric motor according to the present invention.

Figure 1:
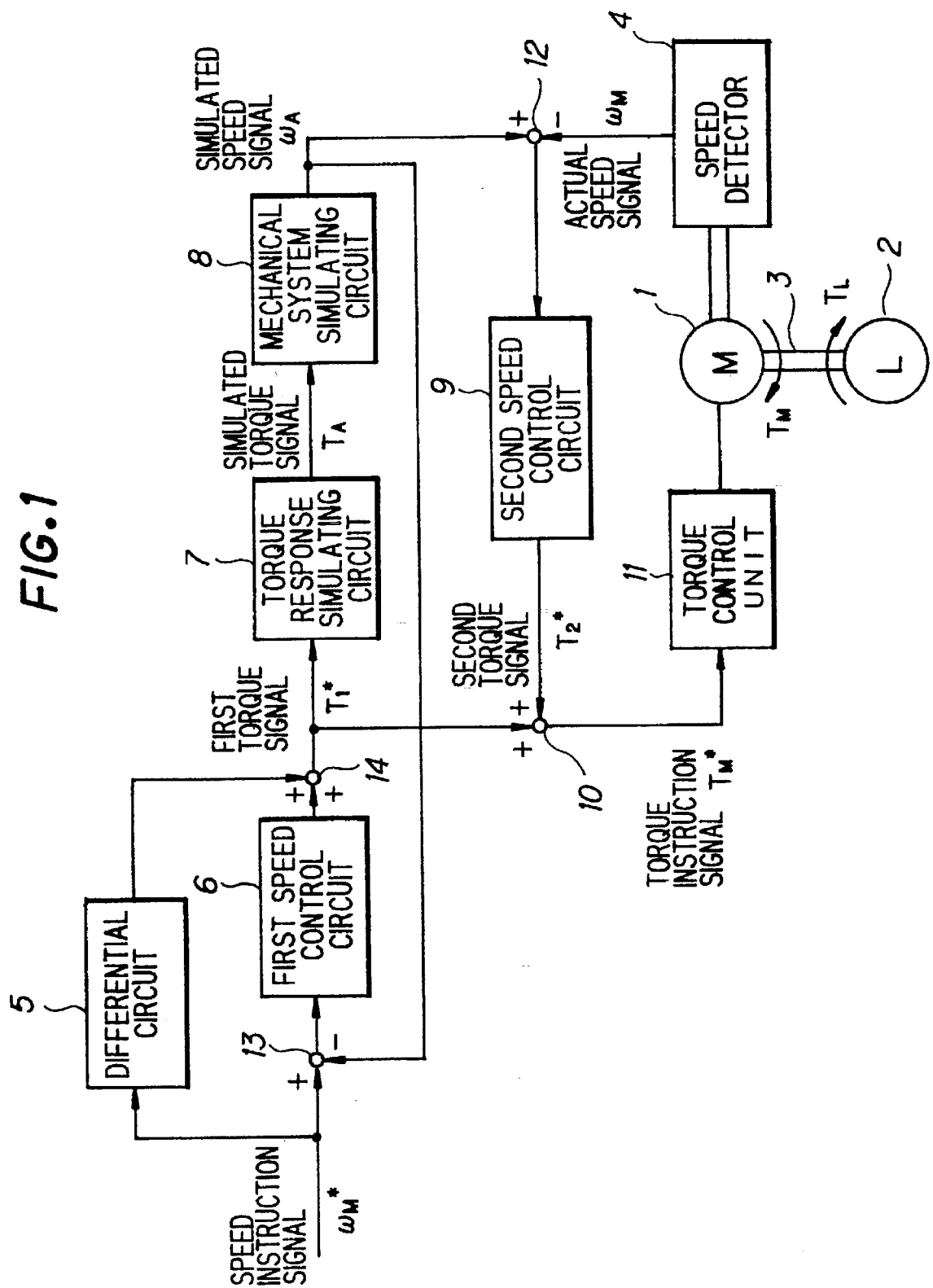
FIG. 1 is a block diagram showing the configuration of a controller for an electric motor constructed according to Embodiment 1 of the invention.

A description is first given of Embodiment 1 with reference to FIG. 1 to FIG. 7. In these figures, components having like reference numerals assigned thereto are the same. FIG. 1 is a block diagram showing the general configuration of a controller for an electric motor according to Embodiment 1. In this figure, designated at reference numeral 5 is a differential circuit for differentiating a speed instruction signal $\omega_M^*$ and outputting a differential signal, at 13 a subtracter for outputting an error $(\omega_M^* - \omega_A)$ between the speed instruction signal $\omega_M^*$ and a simulated speed signal $\omega_A$, at 6 a first speed control circuit for outputting a control signal so that the speed error $(\omega_M^* - \omega_A)$ will become smaller, and at 14 an adder for summing an output from the differential circuit 5 and an output from the first speed control circuit 6 and outputting a first torque signal.

Also, designated at reference numeral 7 is a torque response simulating circuit for simulating the transmittance from a torque instruction signal $T_M^*$ up to a torque $T_M$ generated by the electric motor 1, receiving a first torque signal $T1^*$ inputted thereto, and outputting a simulated torque signal $T_A$, at 8 a mechanical system simulating circuit for simulating the transmittance from a torque $T_M$ of the electric motor 1 to a speed $\omega_M$ of the electric motor 1 in a mechanical system including the electric motor 1, torque transfer mechanism 3, and load machine 2, receiving the simulated torque signal TA inputted thereto, and outputting a simulated speed signal $\omega_A$, at 12 a subtracter for outputting an error $(\omega - \omega_M)$ between the simulated speed signal $\omega_A$ and an actual speed signal $\omega_M$, at 9 a second speed control circuit for outputting a second torque signal $T2^*$ so that the error $(\omega_A - \omega_M)$ will be made smaller; and at 10 an adder for summing the first torque signal $T1^*$ and the second torque signal $T_2^*$ and outputting a torque instruction signal $T_M^*$.

Figure 35:
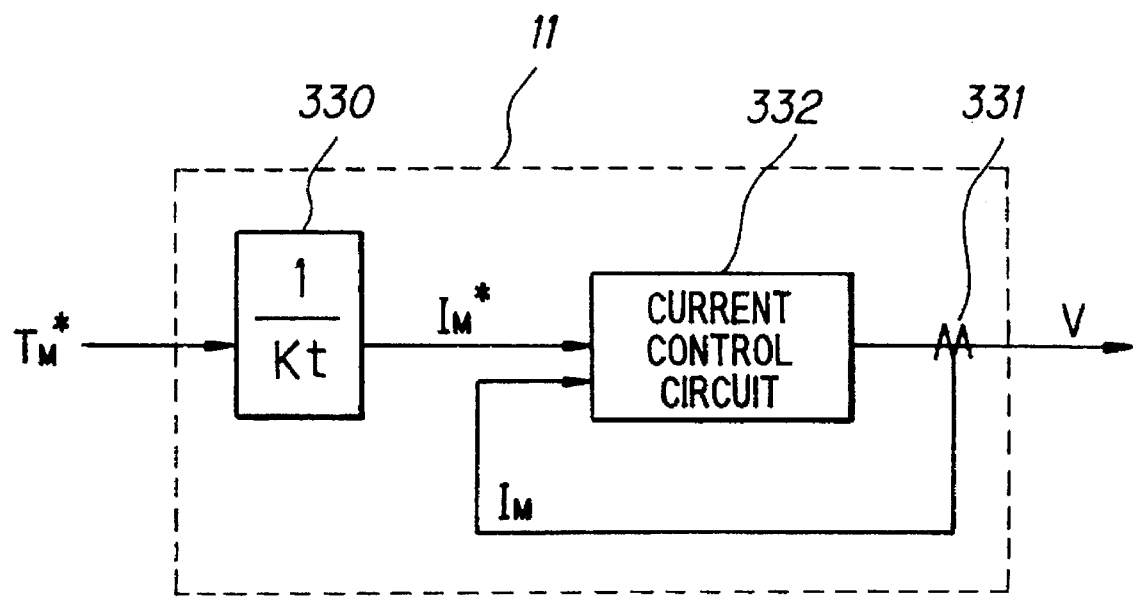
FIG. 35 is a block diagram showing the configuration of the torque control unit shown in FIG. 33.

The configuration and operations of the torque control unit 11 were described in detail with reference to FIG. 35 in relation to the conventional approach, so that a further detailed description thereof is omitted.

Next, a description will be provided of the operations with reference to FIG. 2 to FIG. 7. FIG. 2A is a block diagram of the speed control system shown in FIG. 1, wherein $G_D$ is the transmittance of the differential circuit 5, $G_{V1}$ is the transmittance of the first speed control circuit 6, $G_{V2}$ is the transmittance of a second speed control circuit, $G_T$ is the transmittance $(T_M/T_M^*)$ from the torque instruction signal $T_M^*$ to the torque $T_M$ of the electric motor 1, $G_M$ is the transmittance $(\omega_M/T_M)$ from the torque $T_M$ to the speed $\omega_M$ of the electric motor 1, $G_T$ is the transmittance of the torque response simulating circuit 7 (which is equal to $T_M/T_M^*$), and $G_M$ is the transmittance of the mechanical system simulating circuit 8 (which is equal to $\omega_M/T_M$).

Figure 2A:
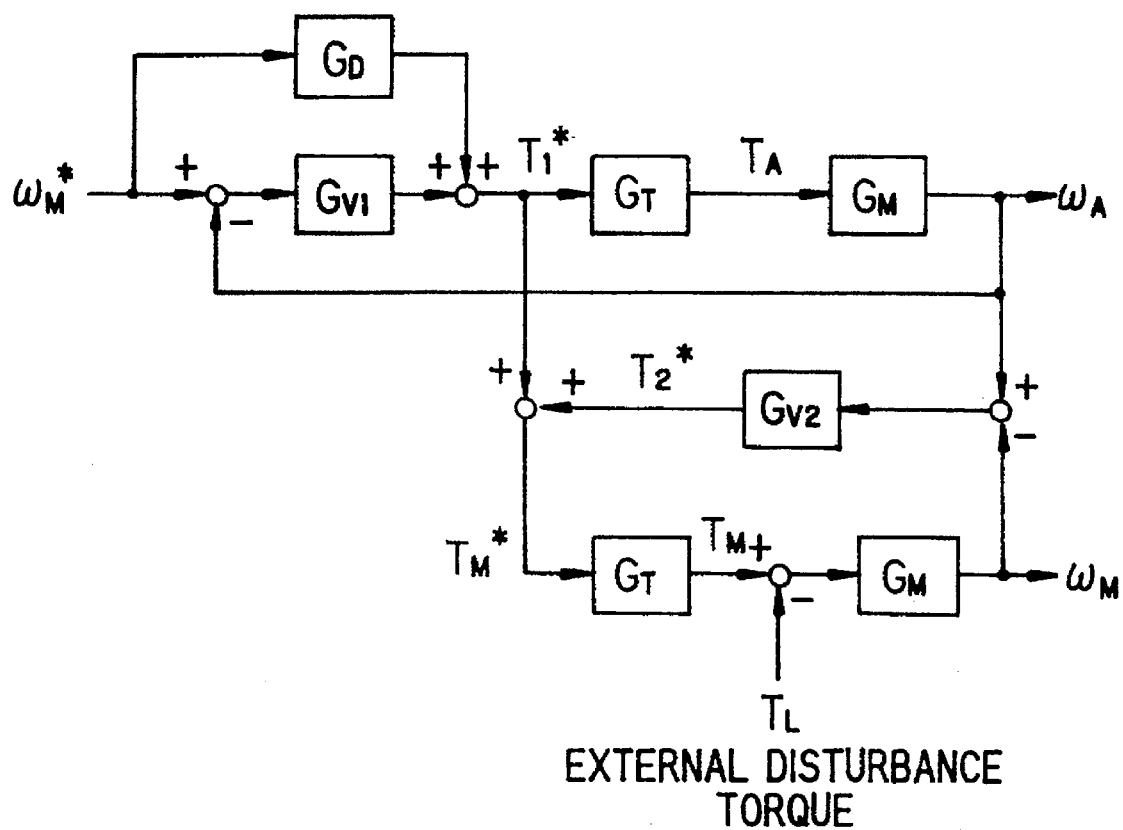
FIGS. 2A and 2B are block diagrams illustrating operations in Embodiment 1.
Figure 2B:
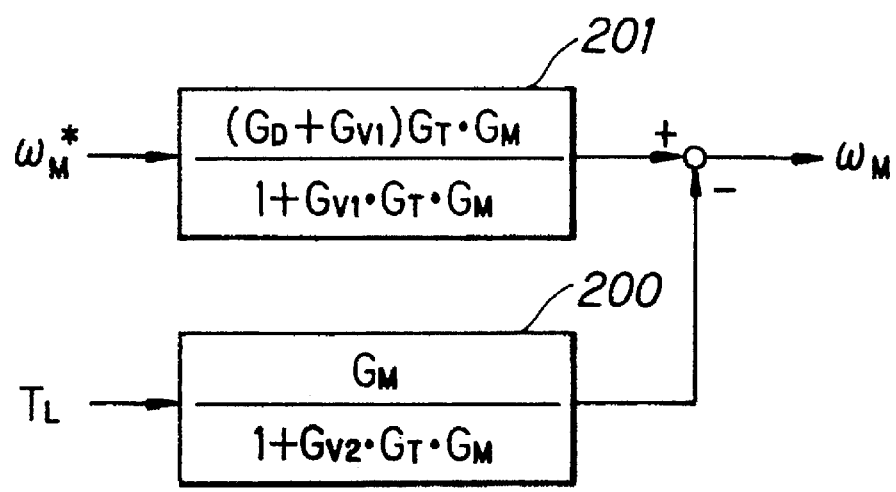

FIG. 2B is a block diagram showing the transmittance block to the speed instruction $\omega_M^*$ and the transmittance block to the external disturbance torque $T_L$ separated from each other. In this figure, the only variable factor in a transmittance block 200 from the external disturbance torque $T_L$ to the speed $\omega_M$ is $G_{V2}$, so that it is understood that the external disturbance response is determined by $G_{V2}$. Also by arranging a transmittance block 201 between the speed instruction $\omega_M^*$ and the speed $\omega_M$ for insuring a stable polar arrangement and offsetting poles having a slow response at a zero point, it is possible to achieve a high target value response.

Figure 34A:
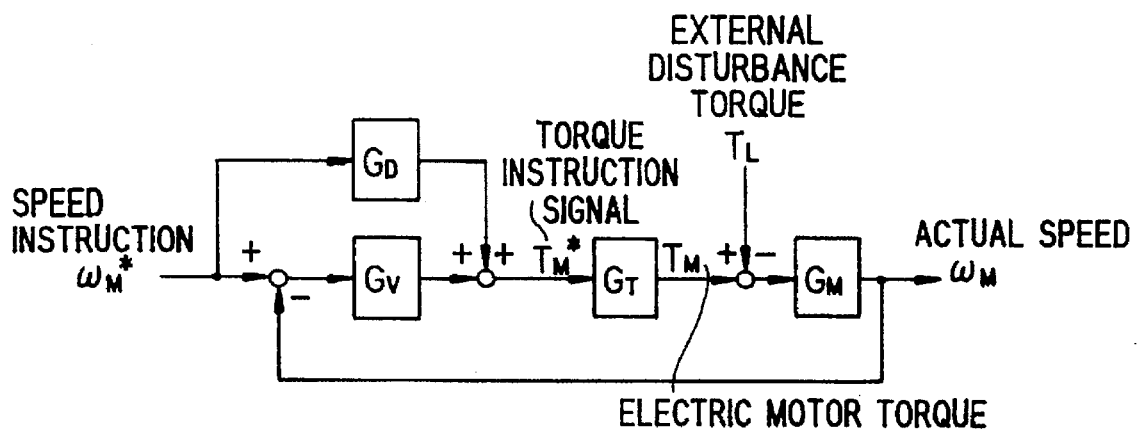
FIGS. 34A and 34B are block diagrams showing operations of a conventional speed controller for an electric motor.

In this case, as the polar arrangement is determined by $G_{V2}$ and arrangement of zero points is determined by $G_D$ and $G_{V1}$, it is understood that the target value response is not affected, even if the external disturbance response is changed by $G_{V2}$. Also, as the transmittance block 201 coincides with a transmittance block 351 shown in FIG. 34, it is understood that the same target value response as that in the conventional speed controller can be obtained. As described above, in the controller for an electric motor according to Embodiment 1, improvement of target value response as well as of external disturbance response is realized.

Figure 3:
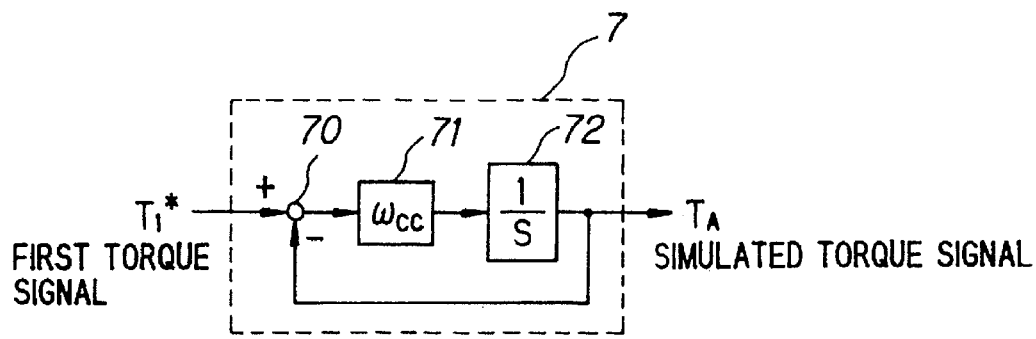
FIG. 3 is a block diagram showing the configuration of a torque response simulating circuit shown in FIG. 1.

Next, a description will be provided of the configuration of the various elements of FIG. 1 with reference to FIG. 3 to FIG. 6. FIG. 3 is a block diagram showing the configuration of the torque response simulating circuit 7. In this figure, designated at reference numeral 70 is a subtracter, at 71 a coefficient multiplier with a gain of $\omega_{CC}$, and at 72 an integrator. With the configuration shown in the figure, the transmittance of the torque response simulating circuit 7 coincides with the transmittance from the torque instruction signal $T_M$ of expression (1) to the torque $T_M$ of the electric motor 1.

Figure 4:
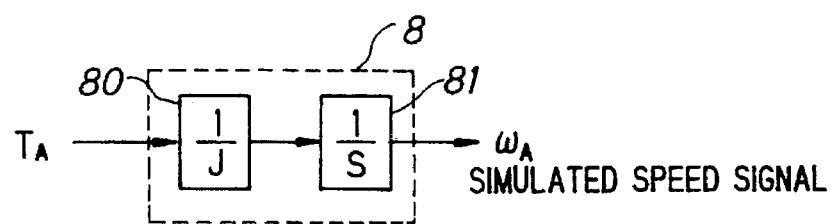
FIG. 4 is a block diagram showing the configuration of the mechanical system simulating circuit shown in FIG. 1.

FIG. 4 is a block diagram showing the configuration of the mechanical system simulating circuit 8. In this figure, designated at reference numeral 80 is a coefficient multiplier, and at 81 an integrator. The gain of the coefficient multiplier 80 is the inverse of a sum J of the inertia of the electric motor 1, the load machine 2, and the torque transfer mechanism 3. With the configuration shown in the figure, the transmittance of the mechanical system simulating circuit 8 coincides with the transmittance from the torque $T_M$ of the electric motor 1 to the speed $\omega_M$ of the electric motor 1.

Figure 5:
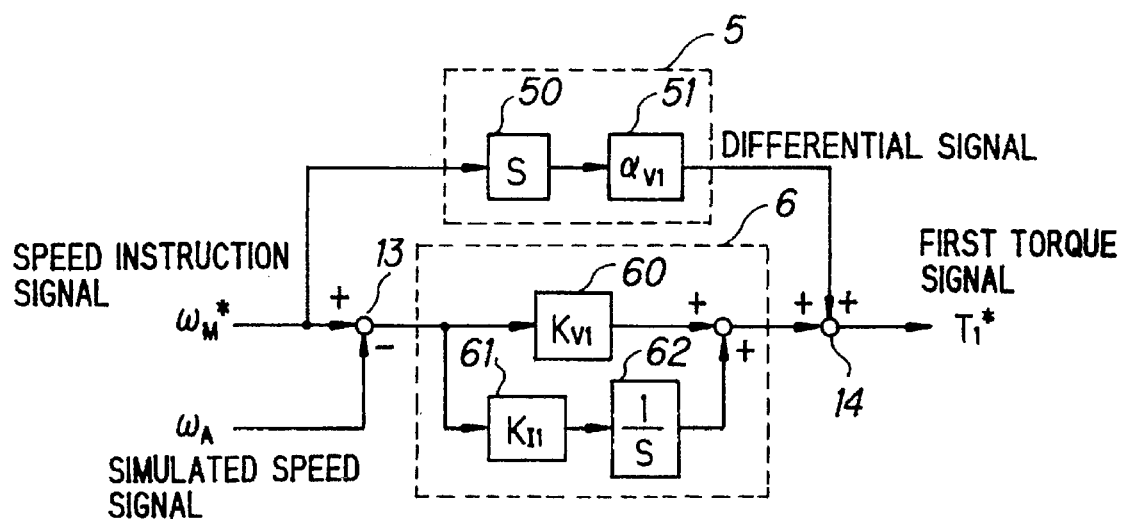
FIG. 5 is a block diagram showing the configuration of the differential circuit and the first speed control circuit shown in FIG. 1.

FIG. 5 is a block diagram showing the configuration of a speed control section including a differential circuit 5, a first speed control section 6, a subtracter 13, and an adder 14. In this figure, designated at reference numeral 50 is a differentiator, and at 51 a coefficient multiplier for the gain $\alpha_{V1}$. Also, designated at reference numeral 60 is a coefficient multiplier for the gain $K_{V1}$, at 61 a coefficient multiplier for the gain $K_{I1}$, at 62 an integrator, and at 63 an adder. The differentiator 50 differentiates the speed instruction signal $\omega_M^*$, and the coefficient multiplier 51 multiplies the output by a coefficient of $\alpha_{V1}$ and outputs a differential signal.

The coefficient multiplier 60, coefficient multiplier 61, and integrator 62 subject a speed error signal $(\omega_M^* - \omega_A)$ obtained by the subtracter 13 to proportional integration and amplification respectively, and the adder 63 sums an output from the coefficient multiplier 60 and that from the integrator 62, and outputs a control signal which reduces the speed error signal. The adder 14 sums an output from the differentiating circuit 5 and that from the first speed control circuit 6, and outputs the sum as a first torque signal $T_1^*$. It should be noted that, as external disturbance is not applied to the speed control loop including the mechanical system simulating circuit 8, first speed control circuit 6, etc., the coefficient multiplier 61 and the integrator 62 in the first speed control circuit 6 may be omitted in the configuration shown in FIG. 5.

Figure 6:
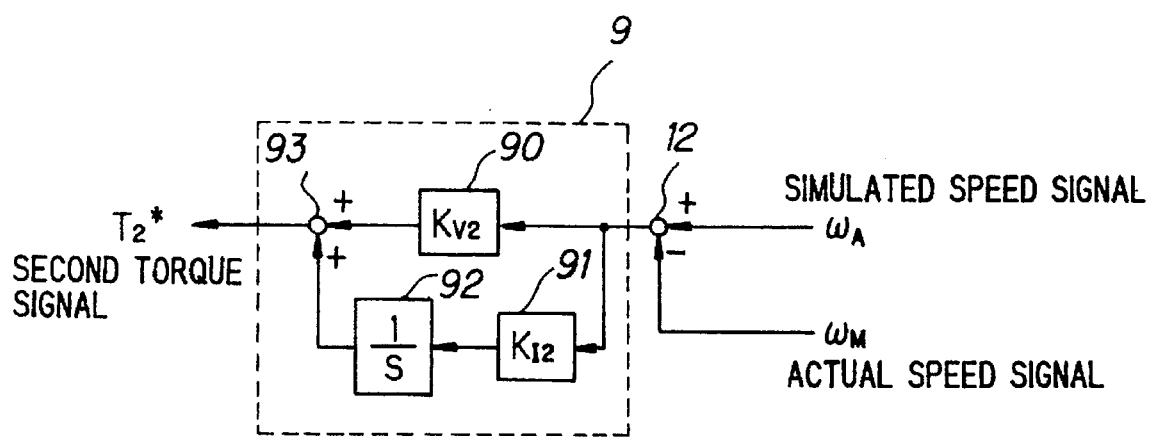
FIG. 6 is a block diagram showing the configuration of the second speed control circuit shown in FIG. 1.

FIG. 6 shows the configuration of a speed control section including a second speed control circuit 9 and a subtracter 12. In this figure, designated by reference numeral 90 is a coefficient multiplier for the gain $K_{V2}$, at 91 a coefficient multiplier for the gain $K_{I2}$, at 92 an integrator, and at 93 an adder. The coefficient multiplier 90, coefficient multiplier 91, and integrator 92 subject a speed error signal $(\omega_A - \omega_M)$ obtained by the subtracter 12 to proportional integration and amplification, and the adder 93 sums an output from the coefficient multiplier 90 and that from the integrator 92 and outputs the sum as a second torque $T_2^*$ to reduce the error.

Next description will be provided to demonstrate the fact that Embodiment 1 is more effective than the conventional speed controller for an electric motor shown in FIG. 33 by means of simulation.

When $G_T$ and $G_M$ are as expressed by expressions (1) and (2) above, if gains for the first speed control circuit and for the differential circuit 5 are set as expressed by expression (17), the fastest target value response not causing overshooting can be obtained.

$$K_{V1} = \frac{J \cdot \omega_{CC}}{2} \quad (17)$$

$$K_{I1} = 0$$
$$\alpha_{V1} = J$$

In this step, the transmittance from the speed instruction signal $\omega_M^*$ to the rotational speed $\Delta_M$ of the electric motor 1 is as expressed by expression (18), and coincides with that expressed by expression (7).

$$\frac{\omega_M}{\omega_M^*} = \frac{1}{1 + 2s/\omega_{CC}} \quad (18)$$

In addition, the external disturbance response can independently be set by adjusting the gains $K_{V2}$ and $K_{I2}$ for the second speed control circuit shown in FIG. 6.

Figure 7:
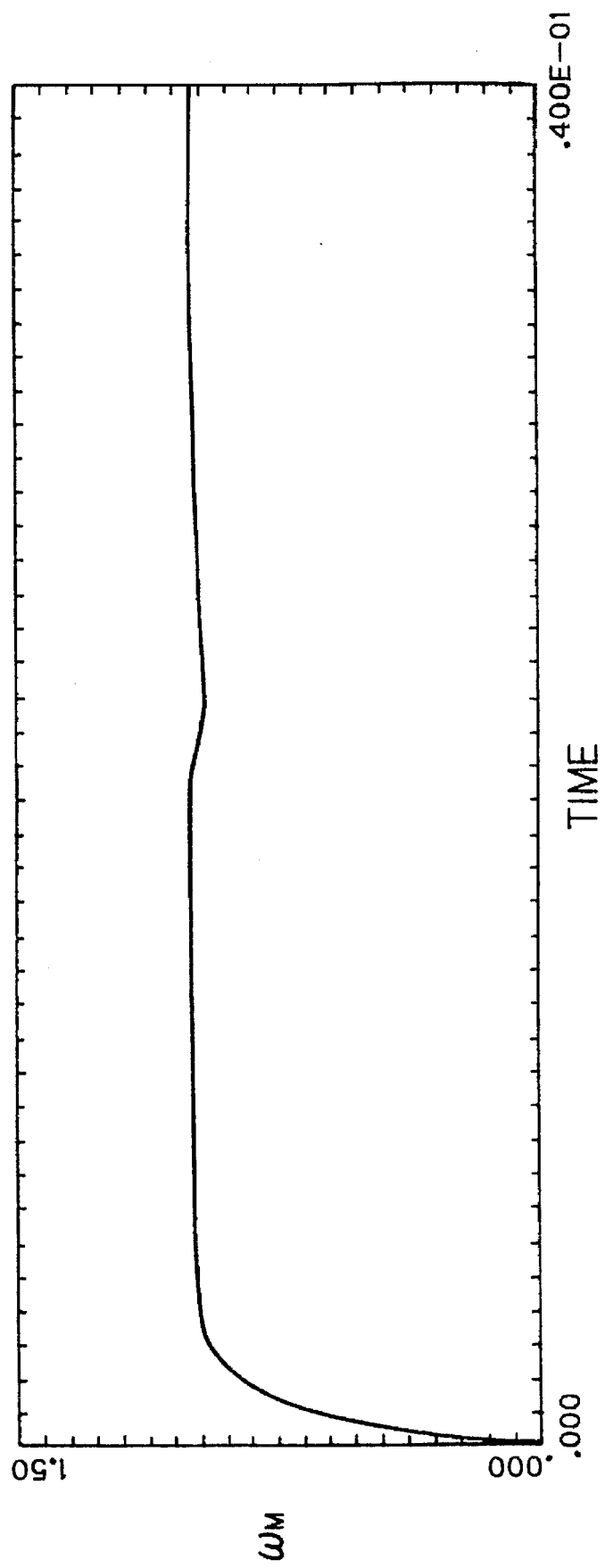
FIG. 7 a graph showing a result of simulation in Embodiment 1.
Figure 36:
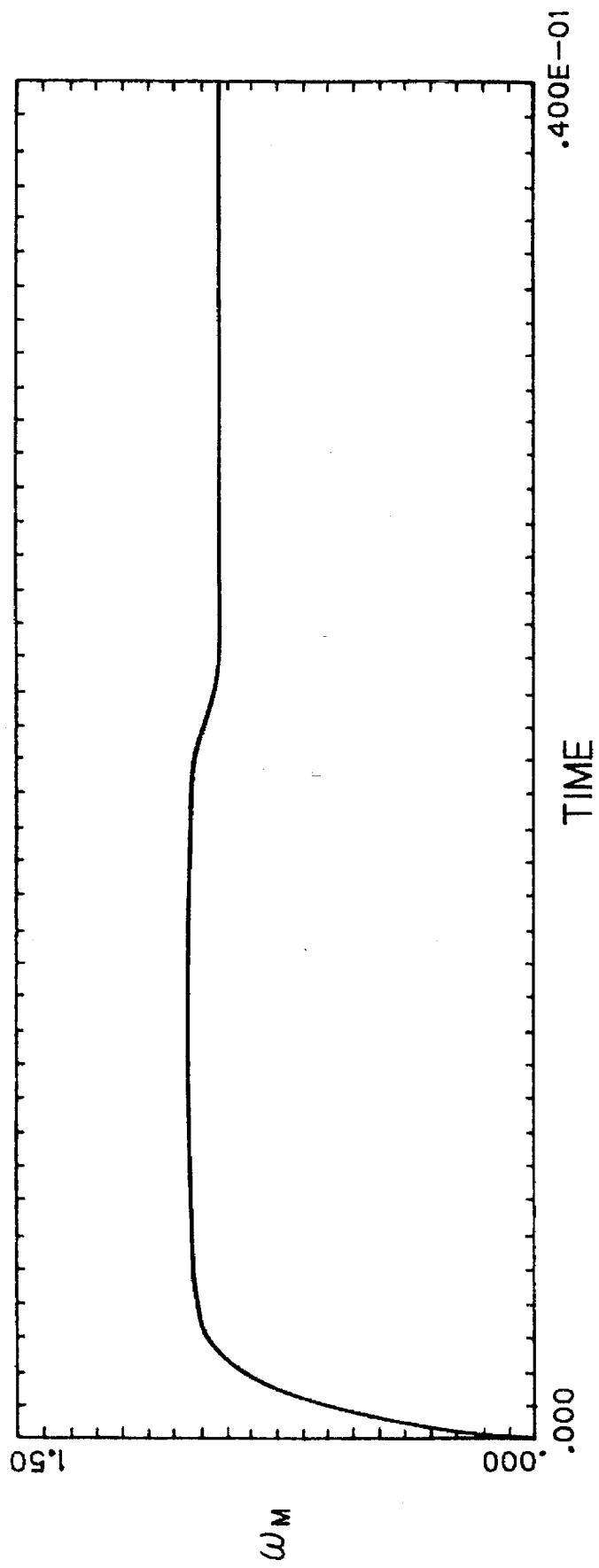
FIG. 36 is a graph showing a result of simulation of a conventional speed controller for an electric motor.
Figure 37:
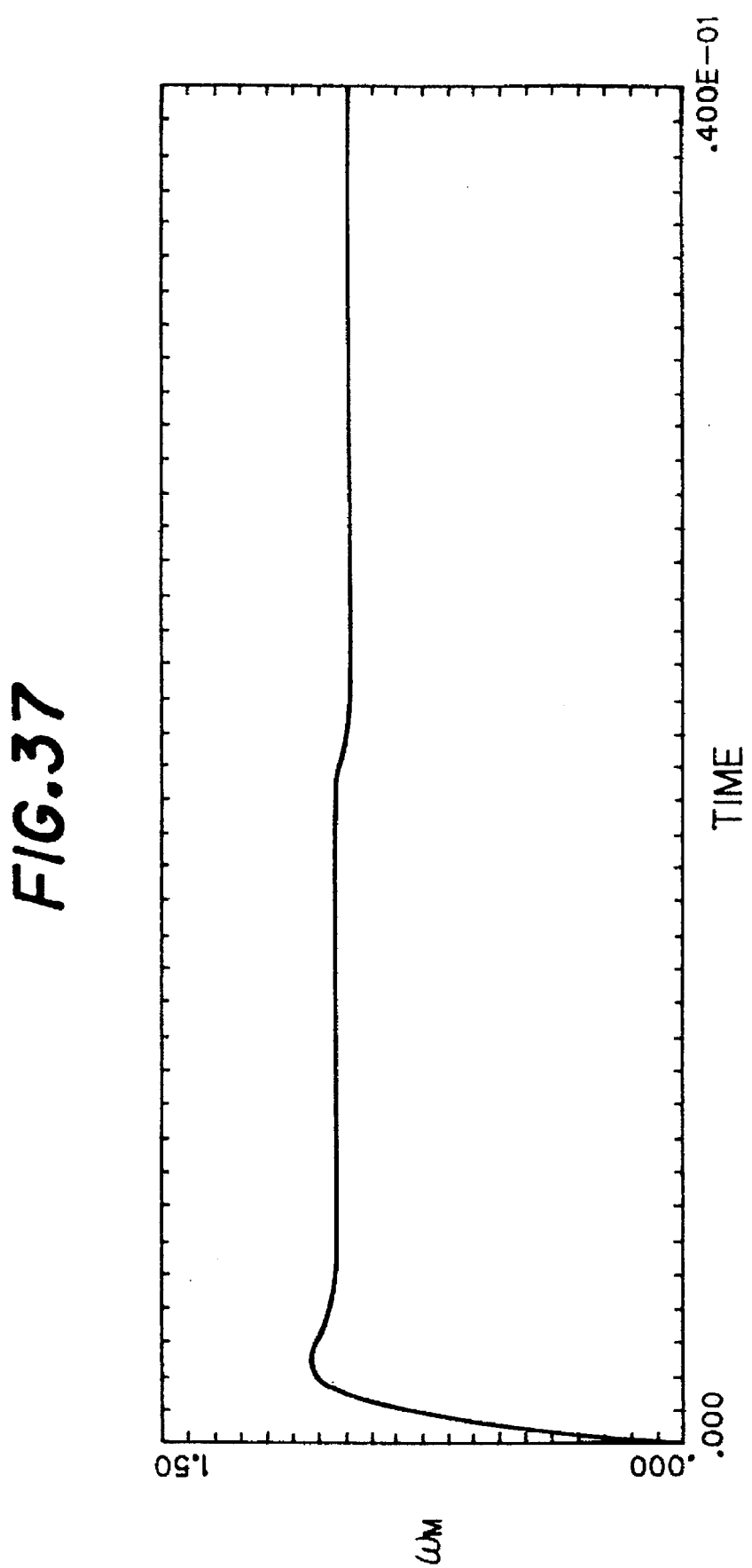
FIG. 37 is a graph showing a result of simulation of a conventional speed controller for an electric motor.
Figure 38:
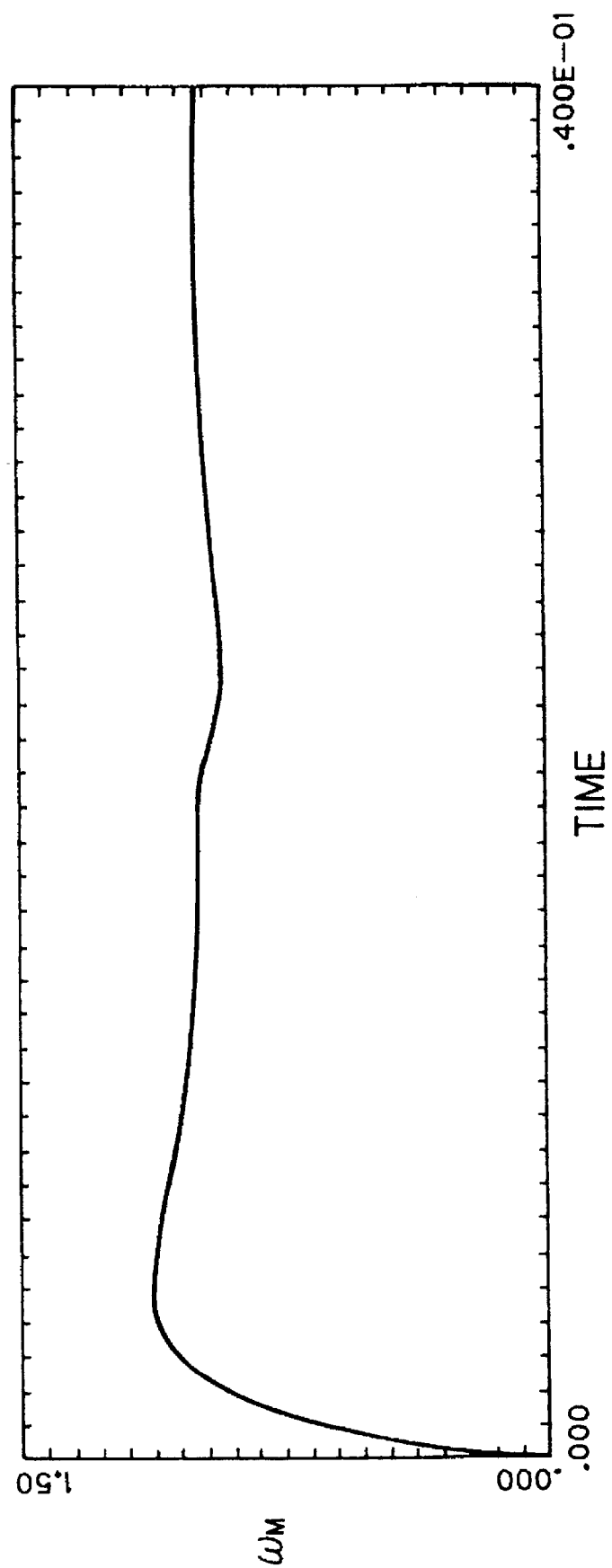
FIG. 38 is a graph showing a result of simulation of a conventional speed controller for an electric motor.

FIG. 7 shows the response in a case where a speed instruction with a scale 1 is applied as a step as indicated by a result of simulation of the conventional approach shown in FIG. 36 to FIG. 38. A step external disturbance torque with a scale 40 is applied from the middle portion of the graph. As in FIGS. 36 to 38, J is set to 1 and $\omega_{CC}$ to 2000. In this figure, the various gains are set as follows: $\alpha_{V1}$ to 0.5, $K_{V1}$ to 500, $K_{I1}$ to 0, $K_{V2}$ to 1000, and $K_{I2}$ to $2\times10^5$. In the conventional approach, when the external disturbance response is improved, the target value response is deteriorated, but in the configuration shown in FIG. 7, even if the external disturbance is improved, the target value response is not affected and shows good characteristics. For this reason, it is clear that the controller for an electric motor according to Embodiment 1 is more effective as compared to the conventional approach.

Embodiment 2

Figure 8:
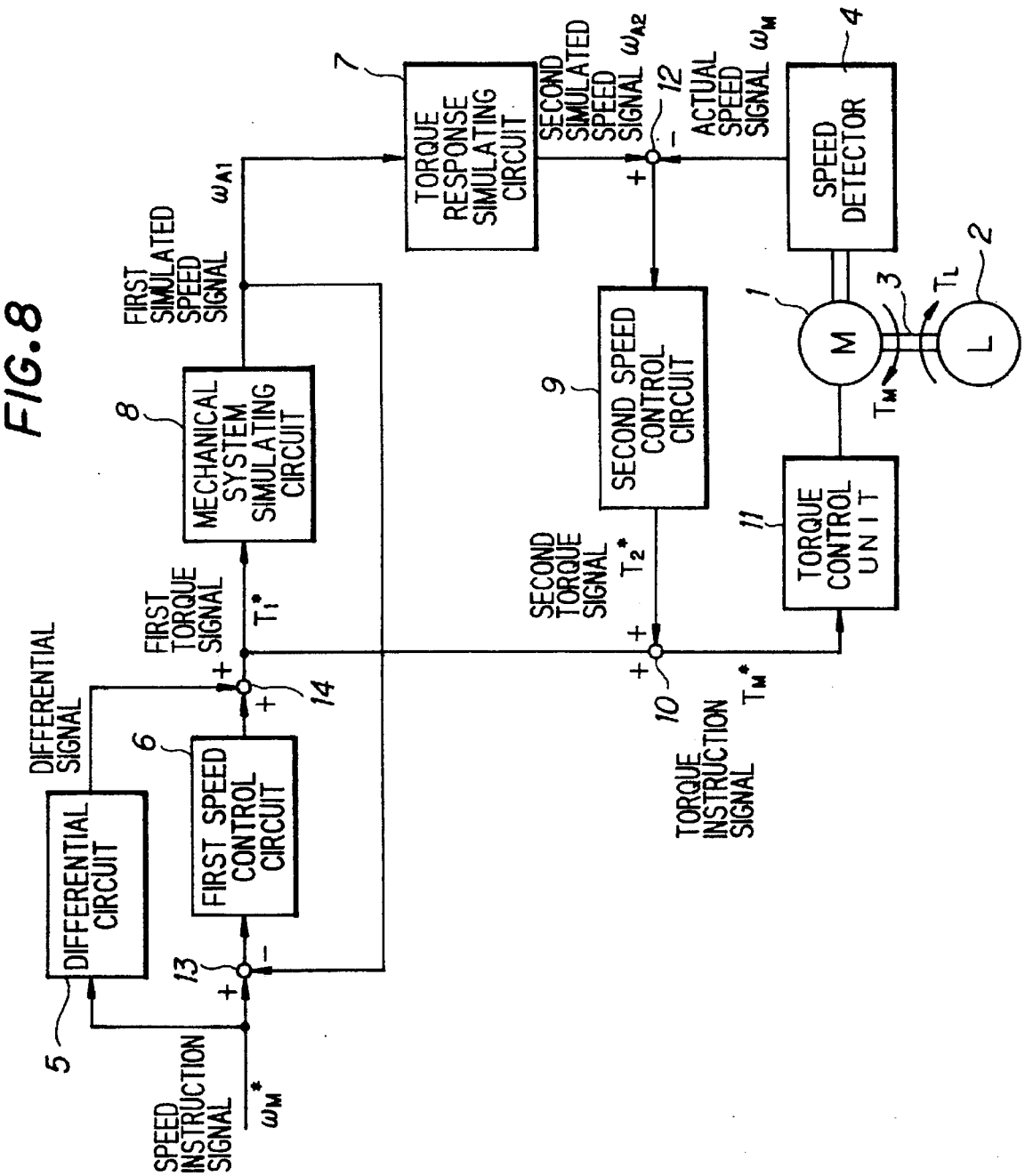
FIG. 8 is a block diagram showing the configuration of a controller for an electric motor according to Embodiment 2.
Figure 9A:
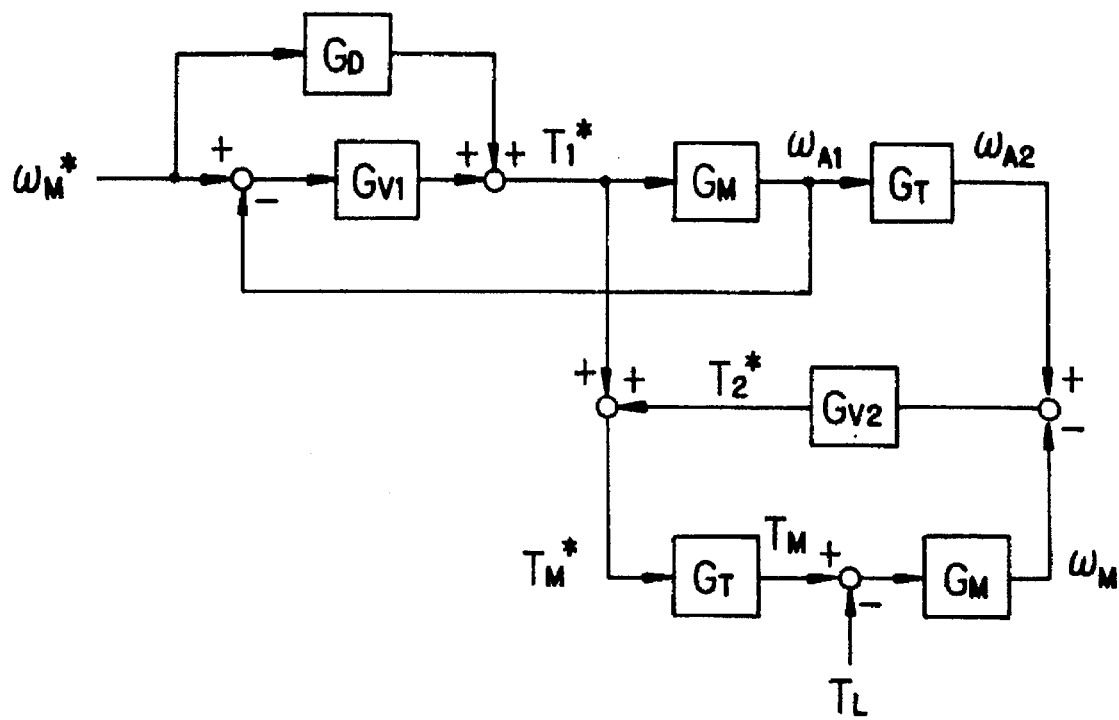
FIGS. 9A and 9B are block diagrams showing operations in Embodiment 2.
Figure 9B:
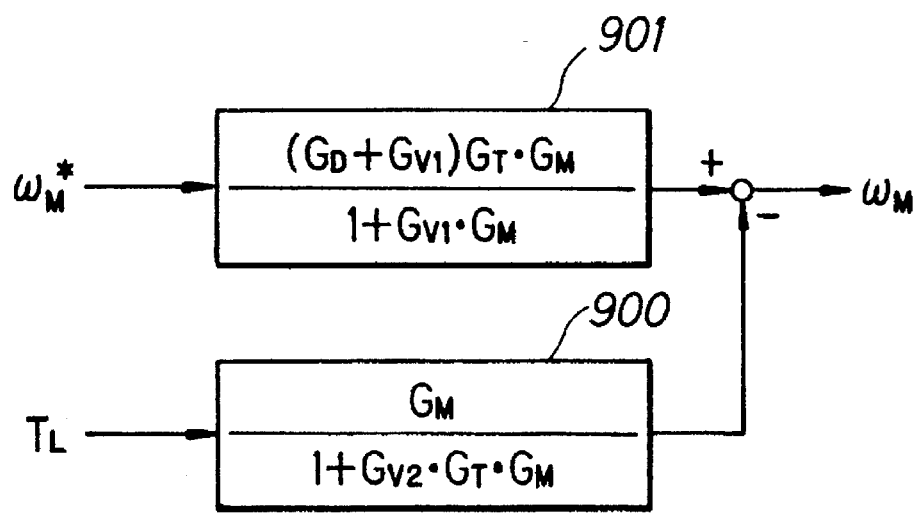
Figure 10:
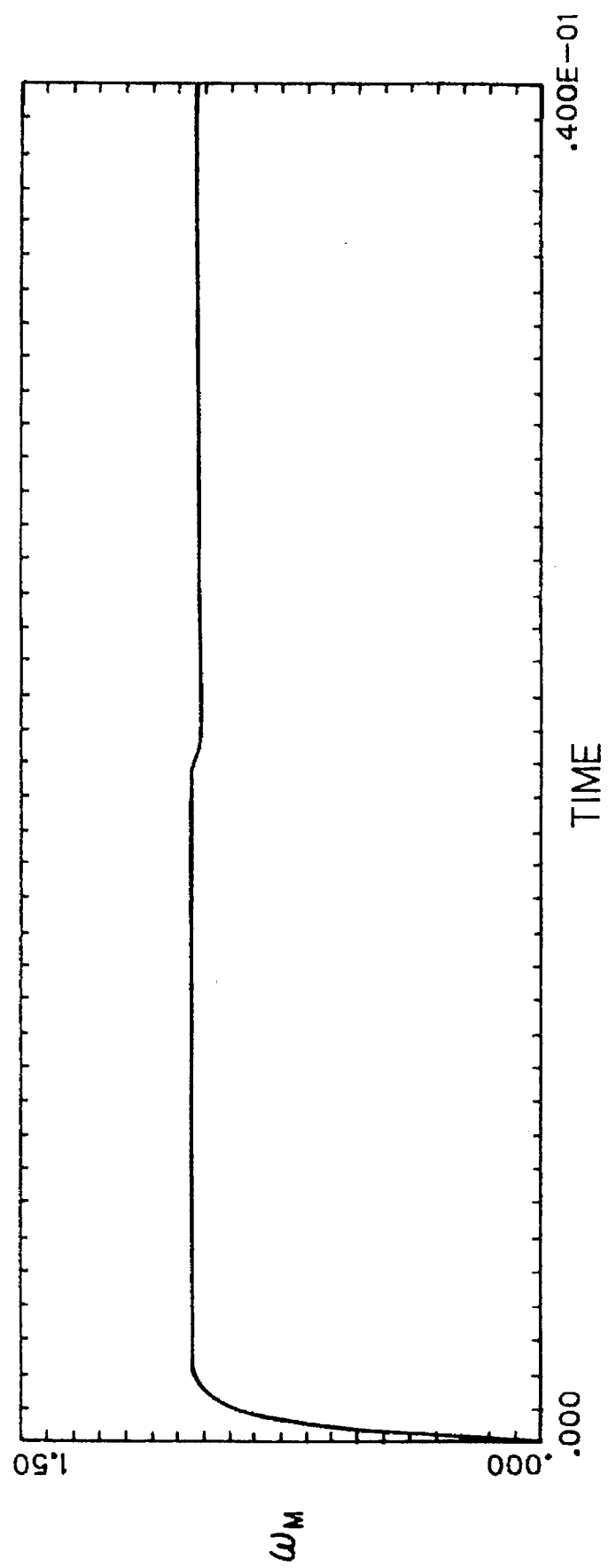
FIG. 10 is a graph showing a result of simulation in Embodiment 2.

Next a description will be provided of Embodiment 2 with reference to FIG. 8 to FIG. 10.

In this figure, components having the same reference number assigned thereto are the same. FIG. 8 is a block diagram showing the configuration of a controller for an electric motor according to Embodiment 2. In this figure, the subtracter 13 outputs an error ($\omega_M^* - \omega_{A1}$) between the speed instruction signal $\omega_M^*$ and the first simulates speed signal $\omega_{A1}$, the first speed control circuit 6 outputs a control signal so that the speed error ($\omega_M^* - \omega_{A1}$) will become smaller, the adder 14 sums an output from the differential circuit 5 and that from the first speed control circuit 6 and outputs a first torque signal $T_1^*$, the mechanical system simulating circuit 8 receives the first torque signal $T_1^*$ inputted thereto and outputs a first simulated speed signal $\omega_{A1}$, the torque response simulating circuit 7 receives the first simulated speed signal $\omega_{A1}$ inputted thereto and outputs a second simulated speed signal $\omega_{A2}$, and the subtracter 12 outputs an error ($\omega_{A2} - \omega_M$) between the second simulated speed signal $\omega_{A2}$ and an actual speed signal $\omega_M$. The operation of each block was described in relation to Embodiment 1, and hence a further description thereof is omitted.

Next, a detailed description will be provided of the operations with reference to FIG. 9A, 9B and FIG. 10. FIG. 9A is a block diagram showing a speed control system in a case where the transmittance of each block in FIG. 8 is set as shown in FIG. 2A. FIG. 9B is a block diagram showing a transmittance block to the speed instruction $\omega_M^*$ and a transmittance block to the external disturbance $T_L$, which are shown separated from each other. In this figure, the only variable factor in a transmittance block 9000 from the external torque $T_L$ to the speed $\omega_M$ is $G_{V2}$, and thus it is understood that the external disturbance response is determined by $G_{V2}$. Also by arranging a transmittance block 901 from the speed instruction $\omega_M^*$ to the speed $\omega_M$ for insuring a stable polar arrangement and offsetting poles having a slow response at a zero point, it is possible to achieve a fast target value response.

Figure 34B:
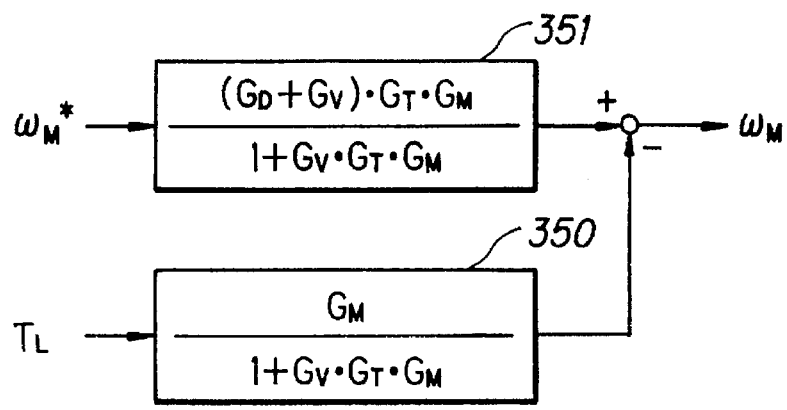

In this case, as the polar arrangement is determined by $G_{V1}$ and the arrangement of zero points is determined by $G_D$ and $G_{V1}$, it is understood that the target value response is not affected even if the external disturbance response is changed by $G_{V2}$. Comparison of the transmittance block 901 in FIG. 9B to the transmittance block 201 shown in FIG. 2B as well as to a transmittance block 351 shown in FIG. 34B shows that as $G_T$ is not included in the second term of the denominator in the block 901, the number of poles is smaller that those in the block 201 and in the block 351. For this reason, for the same number of differentiators included in the differential circuit 5, pole/zero point offsetting can be performed better and a faster target value response can be realized.

Herein, when $G_T$ and $G_M$ are as expressed by expressions (1) and (2) above, if the gains of the first speed control circuit and the differential circuit 5 are set as indicated by expression (19), the fastest target value response not causing overshooting can be obtained $$K_{V1} = J \cdot \omega_{CC}$$

$$K_{I1} = 0$$

$$\alpha_{V1} = J \quad (19)$$

Then the transmittance from the speed instruction signal $\omega_M^*$ to the rotational speed $\omega_M$ of the electric motor 1 is as expressed by expression (20), and the target value response twice higher than that in the conventional type of controller as indicated by expressions (7) and (18) and that in the controller described in relation to Embodiment 1 can be realized.

$$\frac{\omega_M}{\omega_M^*} = \frac{1}{1 + s/\omega_{CC}} \quad (20)$$

In addition, the external disturbance response can be set by adjusting the gains $K_{V2}$ and $K_{I2}$ for the second speed control circuit 9 shown in FIG. 6 independently from the target value response.

What is described above can be verified below by means of simulation. FIG. 10 shows the results of simulation in a case where J is set to 1 and $\omega_{CC}$ to 2000 as shown in FIGS. 36 to 38 and in FIG. 7, a speed instruction with scale 1 is applied as a step, and a step external disturbance with scale 40 is applied from the middle of the graph, and with each gain set as follows: $\alpha_{V1}$ to 1, $K_{V1}$ to 1000, $K_{V2}$ to 1000, and $K_{I2}$ to $2\times10^5$. From this figure, it is understood that the target value response is not affected by the eternal disturbance response, and the target value response can be improved compared to FIGS. 36 to 38 and in FIG. 7. For the reasons as described above, it is clear that the controller for an electric motor according to Embodiment 2 is far more effective as compared to that based on the conventional approach.

Embodiment 3

Figure 11:
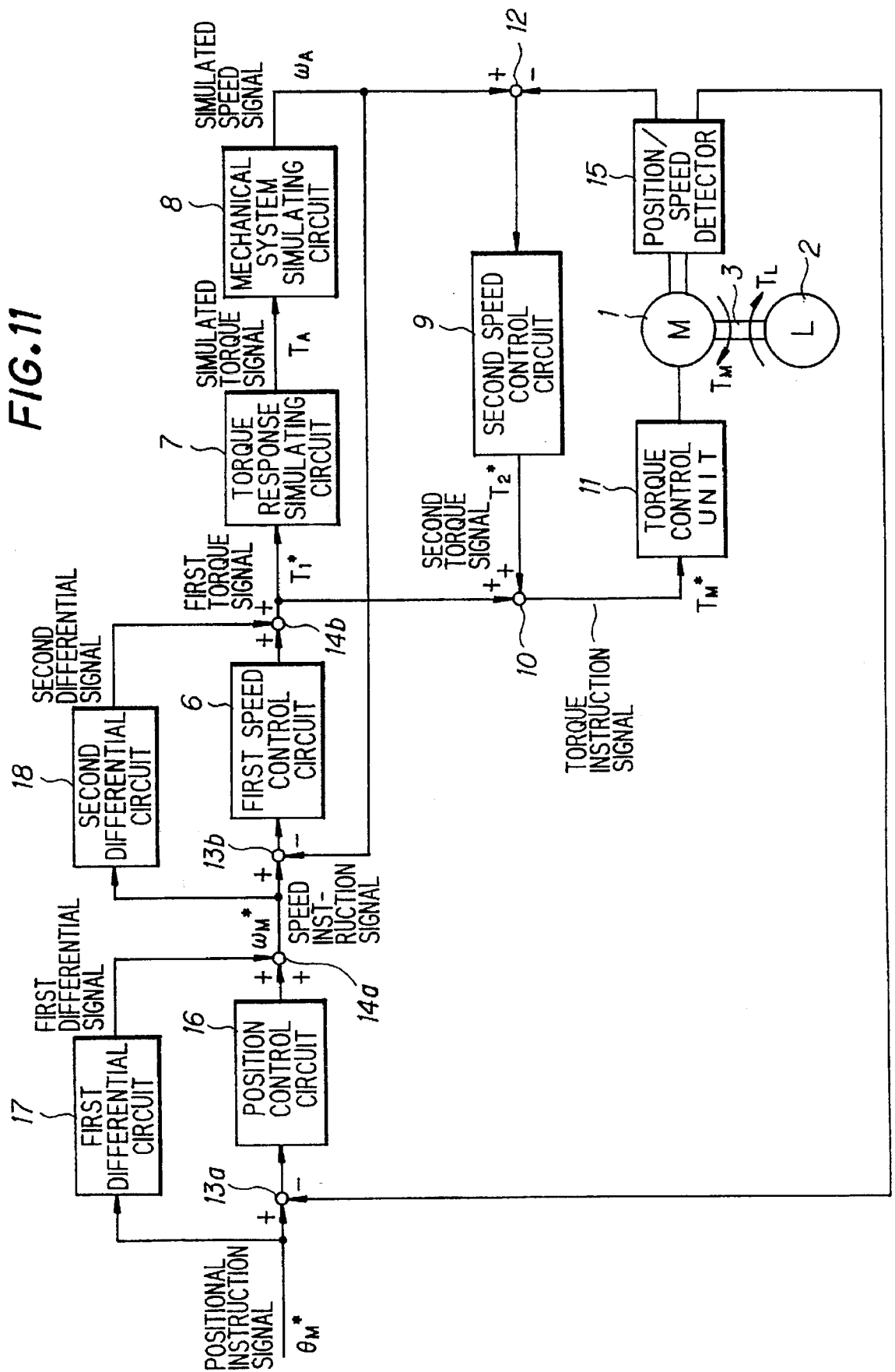
FIG. 11 is block diagram showing the configuration of controller for an electric motor according to Embodiment 3.

Next a description will be provided of Embodiment 3 with reference to FIGS. 11 to 14. In this figure, components identified by the same reference numerals are the same. FIG. 11 is a block diagram showing the general configuration of a controller for an electric motor according to Embodiment 3. In this figure, designated at reference numeral 15 is a position/speed detector for detecting a position and a speed of the electric motor 1 and outputting an actual position signal $\theta_M$ and an actual speed signal $\omega_M$, at 16 a position control circuit for outputting a speed signal so that an error between a positional instruction signal $\theta_M^*$ and an actual position signal $\theta_M$ is made smaller, at 17 a first differential circuit for differentiating the positional instruction signal $\theta_M^*$ and outputting a first differential signal, at 18 a second differential circuit for differentiating the speed instruction signal $\omega_M^*$ and outputting a second differential signal, at 13a and 13b a subtracter respectively, and at 14a and 14b an adder respectively. Other elements are the same as those in FIG. 1 and hence a further description thereof is omitted.

Figure 12:
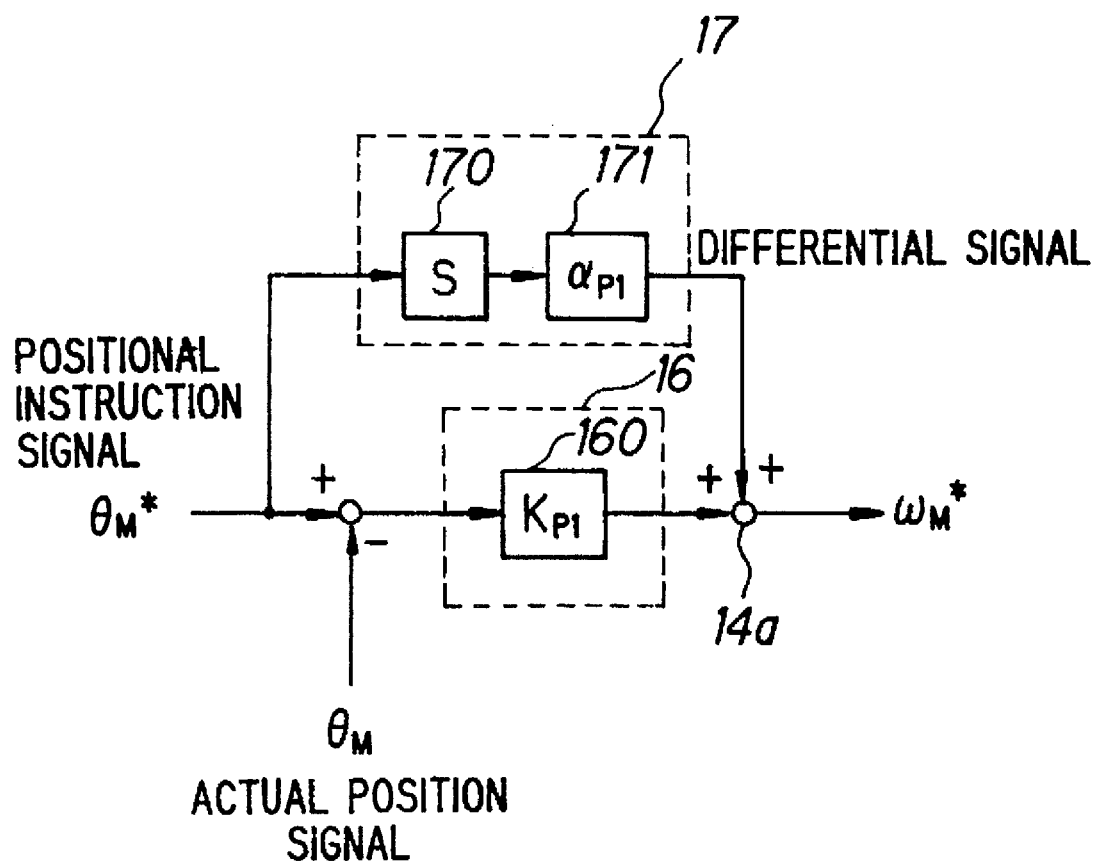
FIG. 12 is a block diagram showing the configuration of the first differential circuit and the position control circuit shown in FIG. 11.
Figure 14:
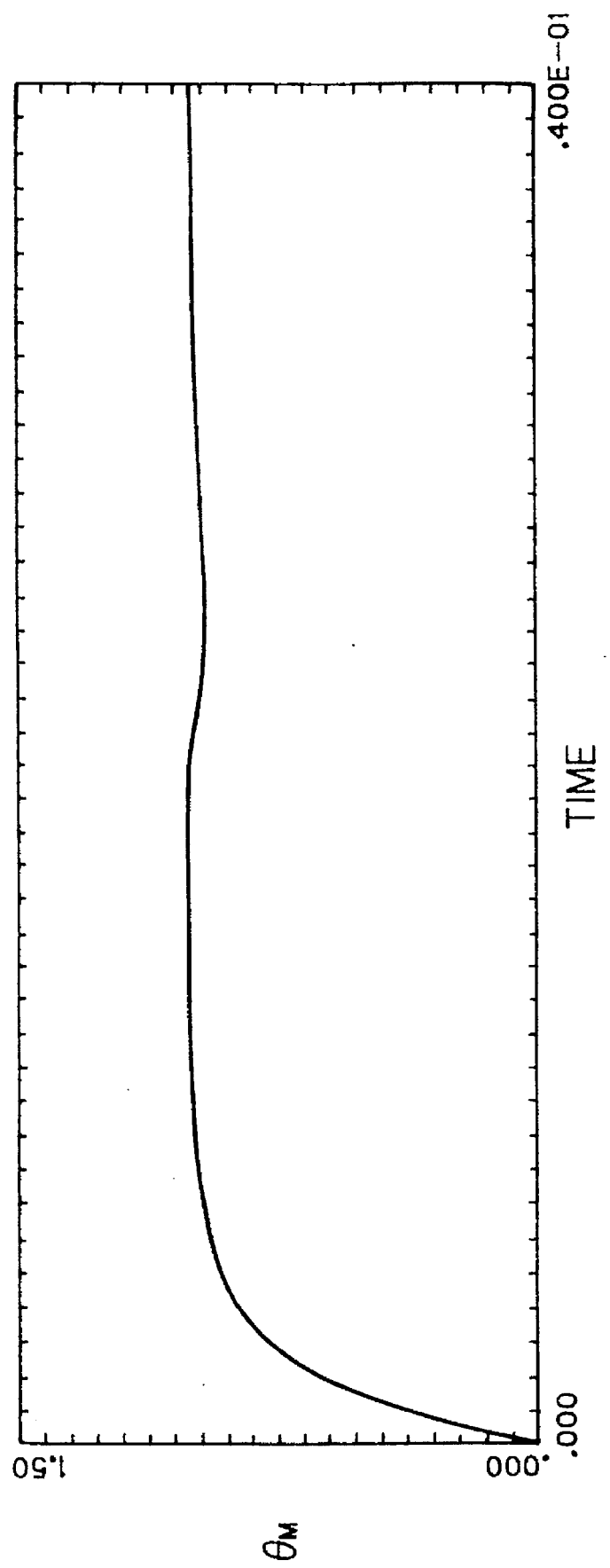
FIG. 14 is a graph showing a result of simulation in Embodiment 3.

Next, a description will be provided of the operations with reference to FIG. 12 and FIG. 14. FIG. 12 shows the configuration of a control section comprising a position control circuit 16, a first differential circuit 17, a subtracter 13a and an adder 14a. In this figure, designated at reference numeral 170 is a differentiator, at 171 a coefficient multiplier for a gain of $\alpha_{P1}$, and at 160 a coefficient multiplier for a gain of $K_{P1}$. The differentiator 170 differentiates the positional instruction signal $\theta_M^*$, and a coefficient multiplier 171 multiplies the output by $\alpha_{P1}$ and outputs a differential signal. The coefficient multiplier 160 multiplies a positional error signal $(\theta_M^* - \theta_M)$ obtained by the subtracter 13a by $K_{P1}$ and outputs a control signal so that the positional error becomes smaller. The adder 14a sums an output from the first differential circuit 17 and an output from the position control circuit 16 and outputs the sum as a speed instruction signal $\omega_M^*$.

Next a description will be provided of operational characteristics in Embodiment shown in FIGS. 11 and 12 with reference to FIG. 13 and FIG. 14. FIG. 13A is a block diagram of a position control system in FIG. 11 in a case where $G_{D1}$ is the transmittance of the first differential circuit 17, $G_{D2}$ is the transmittance of a second differential circuit, $G_{P1}$ is the transmittance of the position control circuit 16, $G_{V1}$ is the transmittance of the first speed control circuit 6, $G_{V2}$ is the transmittance of a second speed control circuit, $G_T$ is the transmittance from the torque instruction signal $T_M^*$ for a torque $T_M$ of the electric motor 1 ($T_M/T_M^*$), and $G_M$ is the transmittance from the torque $T_M$ of the electric motor 1 to the speed $\omega_M$ ($\omega_M/T_M$). Furthermore, the transmittance of the torque response simulating circuit 7 is made coincident to $T_M/T_M^*$, and the transmittance $G_M$ of the mechanical system simulating circuit 8 is made coincident to $\omega_M/T_M^*$.

FIG. 13B is a block diagram showing the configuration prepared by redrawing that shown in FIG. 13A and expressed with a transmittance block to the positional instruction $\theta_M^*$ and a transmittance block to the external disturbance torque $T_L$ separated from each other. From this figure, it is understood that, as variable factors in a transmittance block 1300 from the external disturbance torque $T_L$ to a position $\theta_M$ are $G_{V2}$ and $G_{P1}$, the external disturbance response are determined by $G_{V2}$ and $G_{P1}$. To improve the external disturbance response, it is required to make the denominator of the transmittance block 1300 larger, but as $G_{V2}$ is included in the terms $s^1$ and $s^0$ of the denominator while $G_{P1}$ is included only in the term of $s^0$, so that making $G_{V2}$ larger is more effective for improving the external disturbance response.

Also arranging the transmittance 1301 as a stable polar arrangement and offsetting poles having a slow response at a zero point, a fast response can be obtained. In this case, the polar arrangement is determined by $G_{P1}$ and $G_{V1}$, while the arrangement of zero points is determined by $G_{D1}$, $G_{D2}$, $G_{P1}$ and $G_{V1}$. For this reason it is understood that the target value response is not affected even if the external disturbance response is changed by adjusting $G_{V2}$.

When transmittances $G_T$ and $G_M$ are as expressed by expression (1) and expression (2), if each transmittance is set as indicated by expression (21), a fast target value response not causing overshoot can be obtained.

$$\alpha_{P1} = \frac{1}{2}$$

$$K_{P1} = \frac{\omega_{CC}}{8}$$

$$\alpha_{V1} = \frac{J}{2}$$

$$K_{V1} = \frac{J \cdot \omega_{CC}}{4}$$

$$K_{I1} = 0$$

(21)

In this case, the target value response is as indicated by expression (22), and it is understood that response, which is ¼ of that of a current control system, can be obtained.

$$\frac{\theta_M}{\theta_M^*} = \frac{1}{1 + 4s/\omega_{CC}}$$

(22)

Also, the external response can be set independently from the target value response by adjusting the gains $K_{V2}$ and $K_{I2}$ for the second speed control circuit 9 shown in FIG. 6.

What is described above can be verified by means of simulation. FIG. 14 shows the result of simulation in a case where J is set to 1 and $\omega_{CC}$ to 2000, a positional instruction with scale 1 is applied as a step, and a step external disturbance with a scale of 2×104 is applied from the middle of the graph, and with each gain set as follows: $\alpha_{P1}$ to 0.5, $K_{P1}$ to 250, $\alpha_{V1}$ to 0.5, $K_{V1}$ to 500, $K_{I1}$ to 0, $K_{V2}$ to 1000, and $K_{I2}$ to 2×10⁵. From this figure, it is understood that, in spite that the steady-state error has been eliminated with the external disturbance response having been improved, the target response is not affected and is excellent.

Embodiment 4

Figure 15:
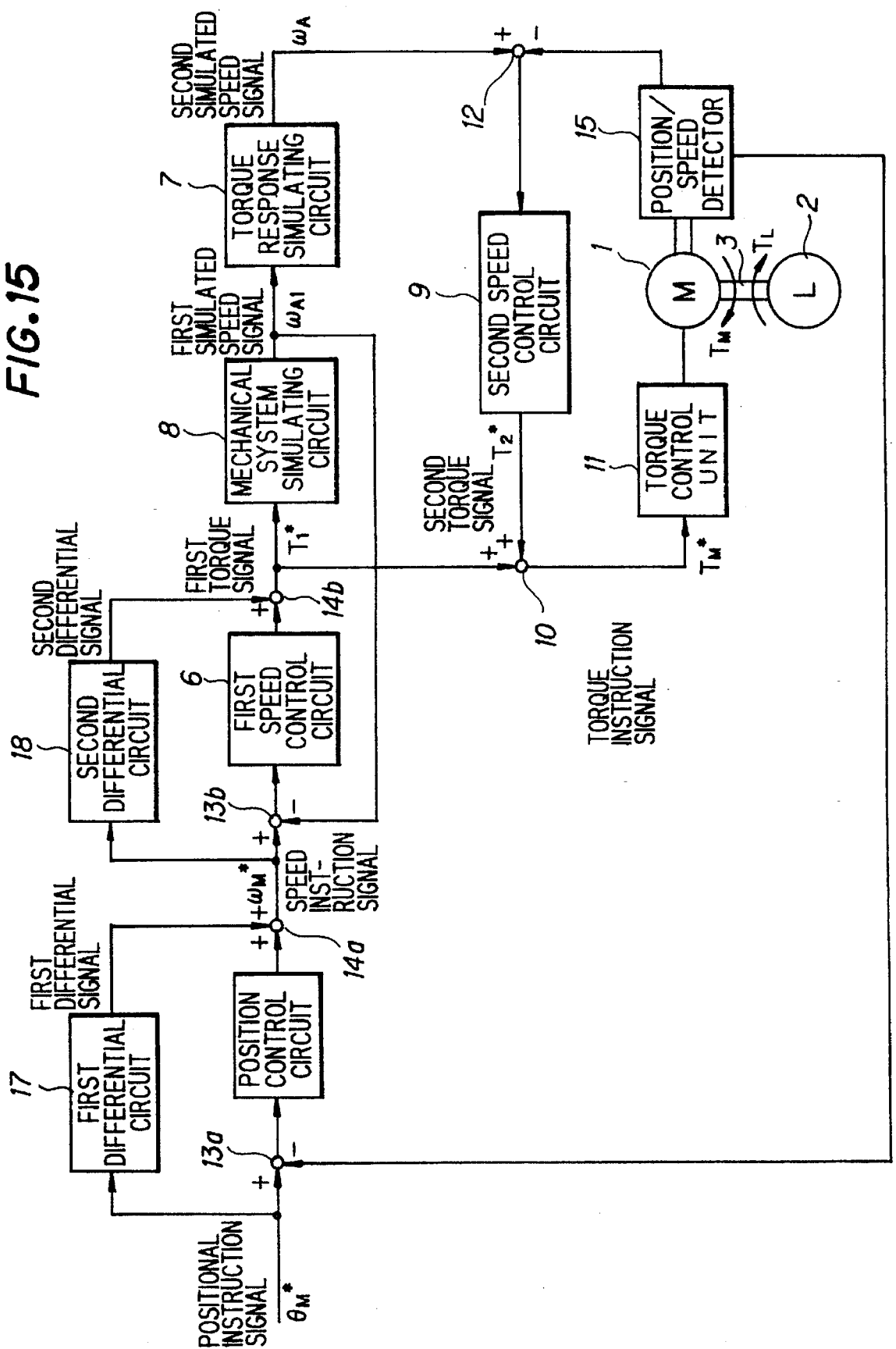
FIG. 15 is a block diagram showing of a controller for an electric motor according to Embodiment 4.
Figure 17:
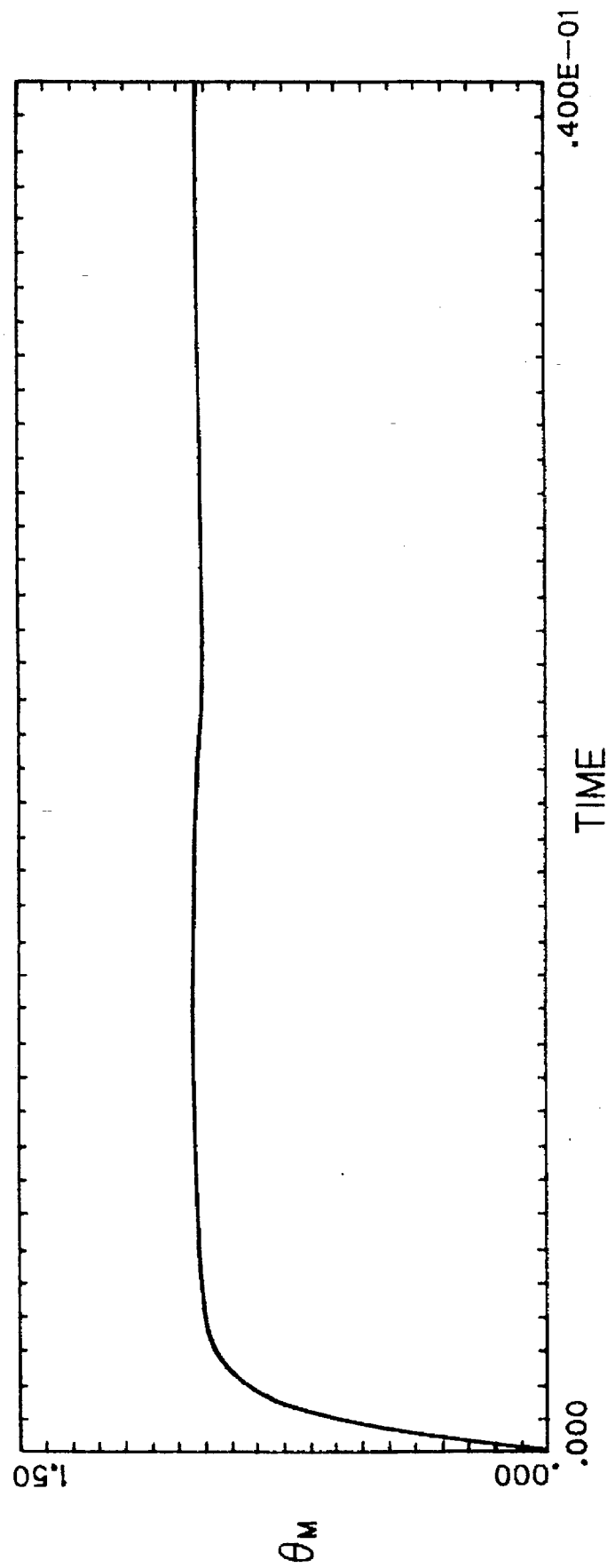
FIG. 17 is a graph showing a result of simulation in Embodiment 4.

Next, a description will be provided of Embodiment 4 with reference to FIG. 15 to FIG. 17. In the figures, components each having the same reference numeral assigned thereto are the same. FIG. 15 is a block diagram showing the configuration of a controller for an electric motor according to Embodiment 4. In this figure, an adder 14b sums an output from a second differential circuit 18 and an output from a first speed control circuit 6 and outputs a first torque signal $T_1^*$, a mechanical system simulating circuit 8 receives the first torque signal $T_1^*$ inputted thereto and outputs a first simulate speed signal $\omega_{A1}$, and a torque response simulating circuit 7 receives the first simulated speed signal $\omega_{A1}$ and outputs a second simulated speed signal $\omega_{A2}$.

Next a description will be provided of operational characteristics in Embodiment 4 with reference to FIGS. 16A and 16B and FIG. 17. FIG. 16A is a block diagram showing a position control system in a case where each transmittance block in FIG. 15 is arranged as in the manner of Embodiment 3 shown in FIG. 13.

FIG. 16B is a block diagram prepared by redrawing the configuration shown in FIG. 16A and expressed with a transmittance block to the positional instruction $\theta_M^*$ and a transmittance block to the external disturbance torque $T_L$ separated from the other. As for the target value response, $G_{D1}$ and $G_{D2}$ may be set by $G_{P1}$ and $G_{V1}$ so that the transmittance block 1601 in FIG. 16B becomes a stable polar arrangement and offsetting poles have a slow response at a zero point. In addition, as the transmittance block 1600 from the external disturbance torque $T_L$ to the position $\theta_M$ is the same as the transmittance block 1300 in FIG. 13 above, even though the external disturbance is improved by adjusting $G_{V2}$, the target value response is not affected.

Comparison of the transmittance block 1601 in FIG. 16B showing the target value response to the transmittance block 1301 in FIG. 13B shows that $G_T$ is not included in the $s^1$ term of the denominator and the number of poles is smaller than that in the block 1301. For this reason, if the numbers of differentiators included in the differential circuits 17 and 18 are identical, pole/zero offsetting can be executed more and the faster target value response can be realized.

When the transmittances for $G_T$ and $G_M$ are as indicated by expressions (1) and expression (2), if the various gains are set as indicated by expression (23), the fastest target value response not causing overshooting can be obtained.

$$\alpha_{P1} = \frac{1}{2}$$

$$K_{P1} = \frac{\omega_{CC}}{4}$$

$$\alpha_{V1} = J$$

$$K_{V1} = \frac{J \cdot \omega_{CC}}{2}$$

$$K_{I1} = 0$$

(23)

The target value response in this case is as indicated by expression (24), and it is understood that a response half that in the current control system can be obtained.

$$\frac{\theta_M}{\theta_M^*} = \frac{1}{1 + 2s/\omega_{CC}}$$

(24)

Also the external disturbance response can be set independently from the target value response by adjusting the gains $K_{V2}$ and $K_{I2}$ for the second speed control circuit 9 shown in FIG. 6.

What is described can be verified by means of simulation. FIG. 17 shows a result of simulation in a case where J is set to 1 and $\omega_{CC}$ to 2000, a positional instruction with a scale of 1 is applied as a step, a step external disturbance torque with a scale of $2 \times 10^5$ is applied from the middle of the graph, and the various gains are set as follows: $\alpha_{P1}$ to 0.5, $K_{P1}$ to 500, $\alpha_{V1}$ to 1, $K_{V1}$ to 1000, $K_{I1}$ to 0, $K_{V2}$ to 1000, and $K_{I2}$ to $2 \times 10^5$. In this figure, the steady-state error has been eliminated with the external disturbance having been improved, indicating that the target value response is in good condition.

Embodiment 5

Figure 18:
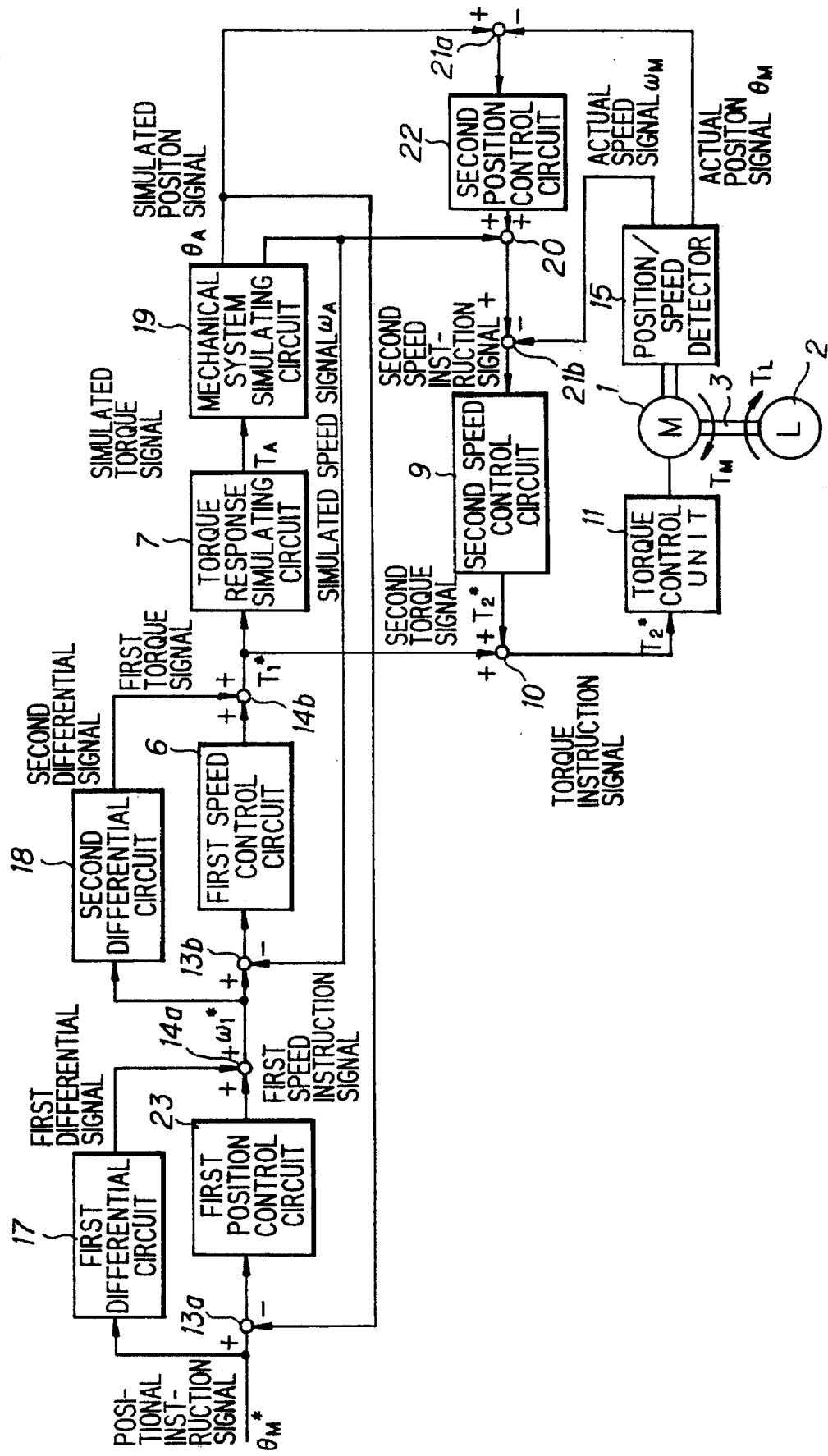
FIG. 18 is a block diagram showing the configuration of a controller for an electric motor according to Embodiment 5.

A description will be provided of Embodiment 5 with reference to FIG. 18 to FIG. 22. In these figures, components each having the same reference numeral assigned thereto are the same. FIG. 18 is a block diagram showing the configuration of a controller for an electric motor according to Embodiment 5. In this figure, designated at reference numeral 19 is a mechanical system simulating circuit for simulating the transmittance from the torque $T_M$ of the electric motor 1 to the rotational speed $\omega_M$ of the electric motor 1 in a mechanical system including the electric motor 1, load machine 2, and torque transfer mechanism 3 and outputting a simulates speed signal $\omega_A$ and a simulated positional signal $\theta_A$, at 21a a subtracter for outputting an error $(\theta_A - \theta_M)$ which is a difference between the simulated positional signal $\theta_A$ and actual positional signal $\theta_M$, and at 22 a second position control circuit receiving the positional error $(\theta_A - \theta_M)$ inputted thereto and an outputting a speed signal which causes the positional error to become smaller.

Also, designated at reference numeral 20 is an adder for summing the simulated speed signal $\omega_A$ and an output from the second position control circuit 22 and outputting a second speed instruction signal $\omega_2^*$, and at 21b a subtracter for outputting an error between the second speed instruction signal $\omega_2^*$ and an actual speed signal $\omega_M$. A subtracter 13a outputs an error $(\theta_M^* - \theta_A)$ between the positional instruction signal $\theta_M^*$ and the simulated positional signal $\theta_A$. Reference numeral 23 indicates a first position control circuit for outputting a speed signal which causes the positional error $(\theta_M^* - \theta_A)$ to become smaller. An adder 14a sums an output from the first differential circuit 17 and that from a first position control circuit 23 and outputs a first speed instruction signal $\omega_1^*$. The first position control circuit 23 is the same as the position control circuit 16 in FIG. 12, and hence a further description thereof is omitted.

Figure 19:
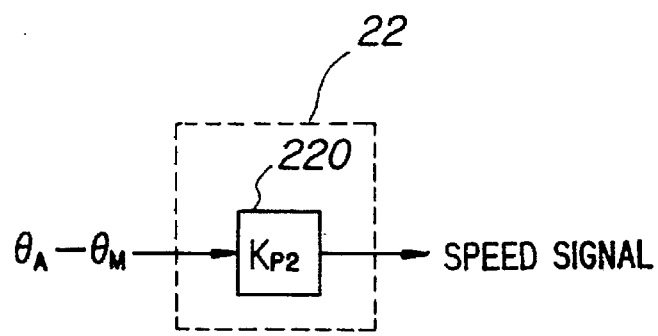
FIG. 19 is a block diagram showing the configuration of a second position control circuit shown in FIG. 18.

FIG. 19 is a block diagram showing the configuration of the second position control circuit 22. In this figure reference numeral 220 indicates a coefficient multiplier with a gain of $K_{P2}$ which multiplies the positional error $(\theta_A - \theta_M)$ by $K_{P2}$ and outputs the product.

Figure 20:
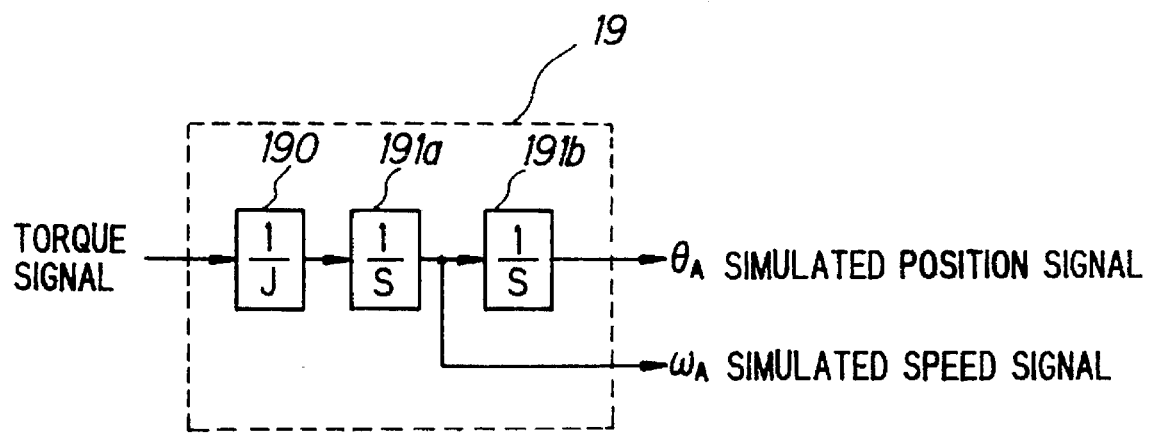
FIG. 20 is a block diagram showing the configuration of the mechanical system simulating circuit shown in FIG. 18.

FIG. 20 is a block diagram showing the configuration of the mechanical system simulating circuit 19. In this figure reference numeral 190 indicates a coefficient multiplier, while reference numerals 191a and 191b indicate integrators. The gain of the coefficient multiplier 190 is the inverse of the value J obtained by summing the inertia of the electric motor 1, the load machine 2, and the torque transfer mechanism 3. A simulated speed signal $\omega_A$ is obtained by integrating an output from the coefficient multiplier 190 with an integrator 191a, and a simulated positional signal $\theta_A$ is obtained by integrating a simulated speed signal $\omega_A$ with an integrator 191b. With the configuration described above, the characteristics of the mechanical system simulating circuit 19 are made coincident to the transmittance from the torque $T_M$ of the electric motor 1, as indicated by expression (2), to the rotational speed $\omega_M$ of the electric motor 1 as well as to the transmittance from the speed $\omega_M$ to the position $\theta_M$.

Figure 22:
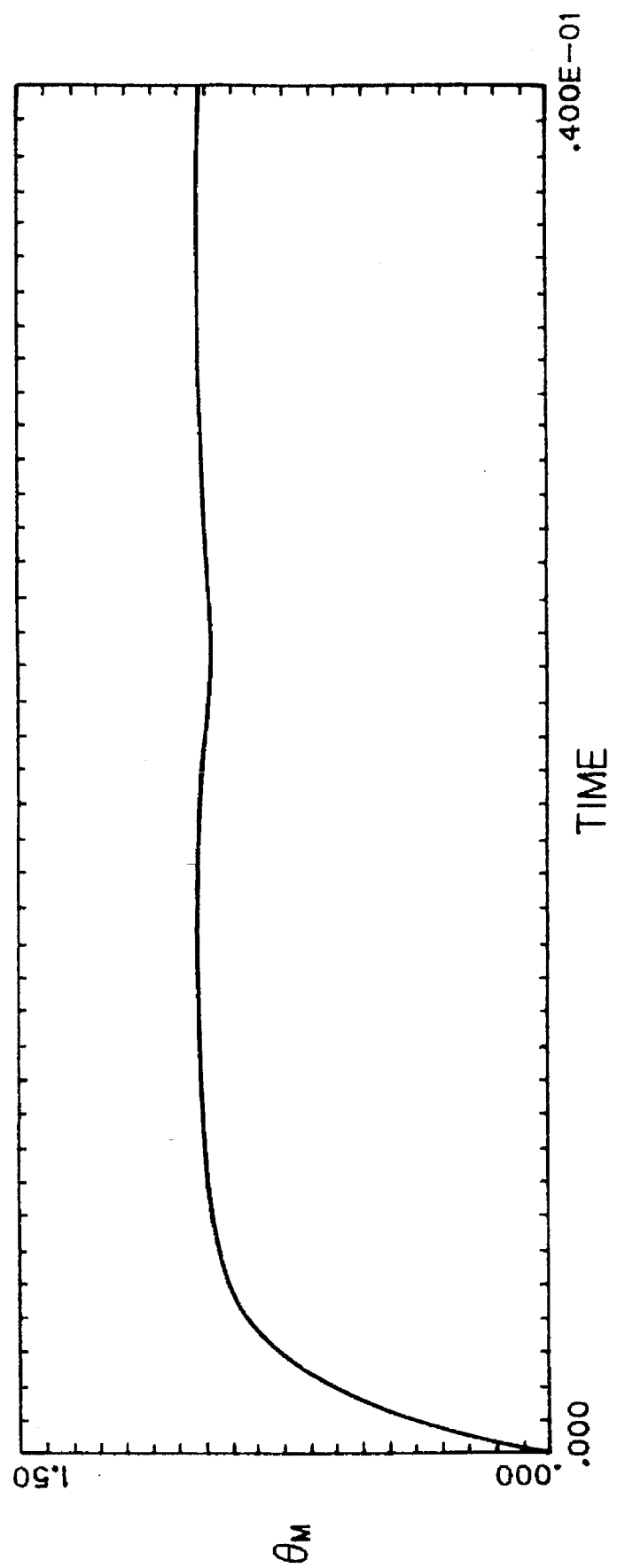
FIG. 22 is a graph showing a result of simulation in Embodiment 5.

Next a description will be provided of operational characteristics in Embodiment 5 with reference to FIG. 21A and 21B and FIG. 22. FIG. 21A is a block diagram showing a position control system in a case where the transmittance of the second position control circuit 22 shown in FIG. 18 is $G_{P2}$ and transmittances for other blocks are set to as shown in FIG. 13 showing Embodiment 3. FIG. 21B is a block diagram prepared by redrawing the configuration in FIG. 21A and expressed with the transmittance block 2101 to a positional instruction $\theta_M^*$ and a transmittance block 2100 to an external disturbance torque TL, each separated from the other. FIG. 21B shows the same construction as that according to Embodiment 3 above shown in FIG. 13B, and for this reason the same control system as that in Embodiment 3 can be employed. FIG. 21B shows that $G_{D1}$, $G_{D2}$, $D_{P1}$, $G_{V1}$ are included only in the transmittance block 2101 and $G_{P2}$ and $G_{V2}$ only in the transmittance block 2100, indicating that the target value response and the external disturbance response can be designed independently from each other.

For designing the target value response, like in Embodiment 3 above, at first $G_{P1}$ and $G_{V1}$ may be designed to insure a stable polar arrangement, and then $G_{D1}$ and $G_{D2}$ may be designed so that poles having a slow response are offset at a zero point respectively. In Embodiment 3 and Embodiment 4 based on the conventional approach, the transmittance which can be adjusted for improving the external disturbance response is only the transmittance $G_{V2}$ of the second speed control circuit 9, but in Embodiment 5, in addition to $G_{V2}$ above, also the transmittance $G_{P2}$ of the second position control circuit 22 can be adjusted, so that the external disturbance response can be improved further.

For instance, if each gain for the first position control circuit 23 and the first speed control circuit 6 are set as indicated by expression (21) above, the fastest target value response not causing overshooting can be obtained. The target value response in that case is as indicated by expression (22), and the response, which is one-fourth that of a current control system, can be obtained. Also the external disturbance response can be set, independently from the target value response, by adjusting the gain $K_{P2}$ for the second position control circuit 22 shown in FIG. 19 and the gains $K_{V2}$ and $K_{I2}$ for the second speed control circuit 9 shown in FIG. 6.

What is described above can be verified by means of simulation. FIG. 22 shows a result of simulation in a case where, in FIG. 22, J is set to 1 and $\omega_{CC}$ to 2000, a positional instruction with a scale of 1 is applied as a step, and a step external disturbance torque with a scale of $2 \times 10^4$ is applied from the middle of the graph, with the various gains set as follows: $\alpha_{P1}$ to 0.5, $\alpha_{V1}$ to 0.5, $K_{P1}$ to 250, $K_{V1}$ to 500, $K_{I1}$ to $2 \times 10^5$, $K_{P2}$ to 500, and $K_{V2}$ to 1000. From FIG. 22 is understood that, in spite of the fact that the steady-state error has been eliminated and the external disturbance response has been improved, the target value response is not affected and remains very good.

Embodiment 6

Figure 23:
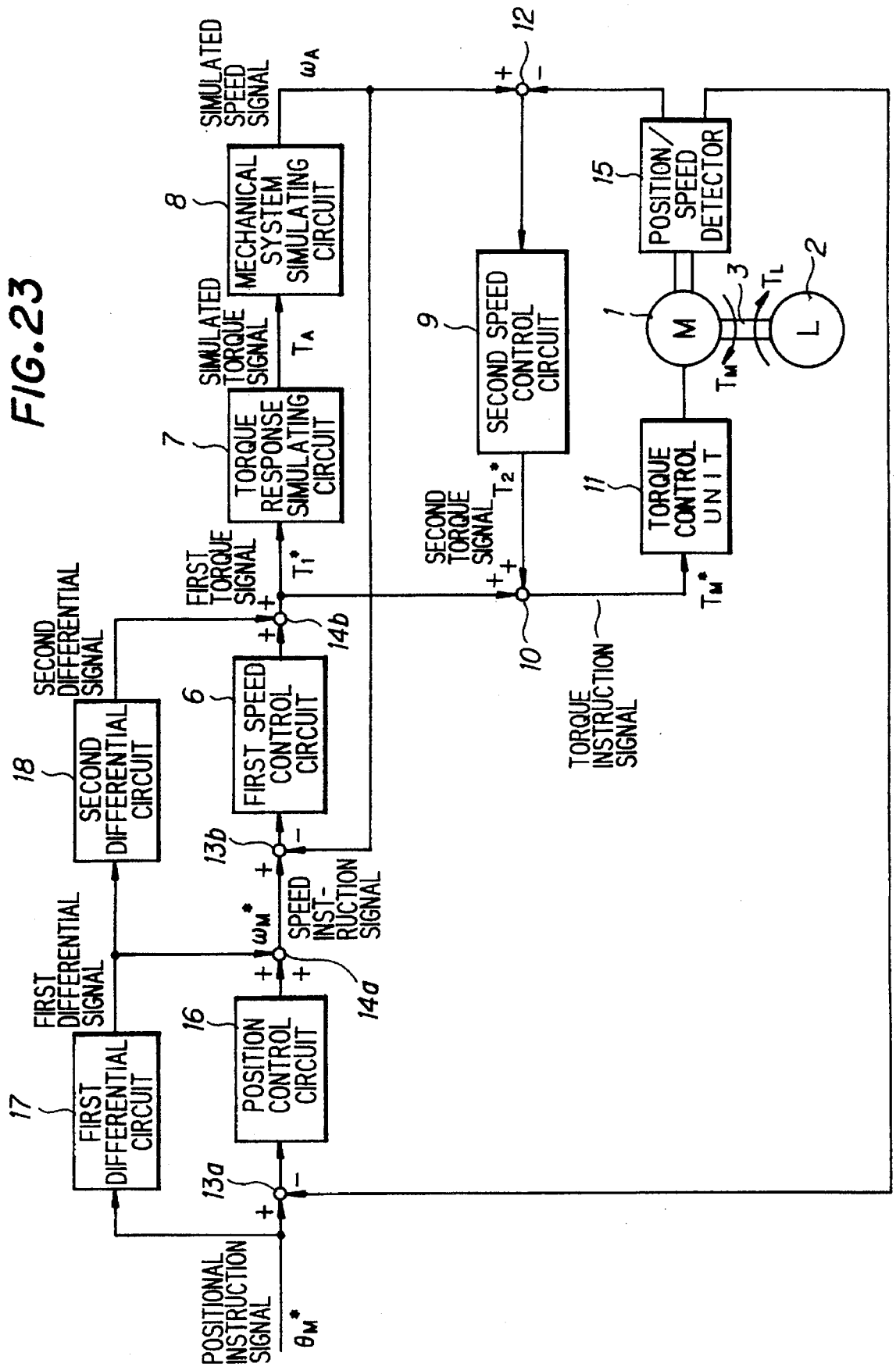
FIG. 23 is a block diagram showing the configuration of a controller for an electric motor according to Embodiment 6.
Figure 24A:
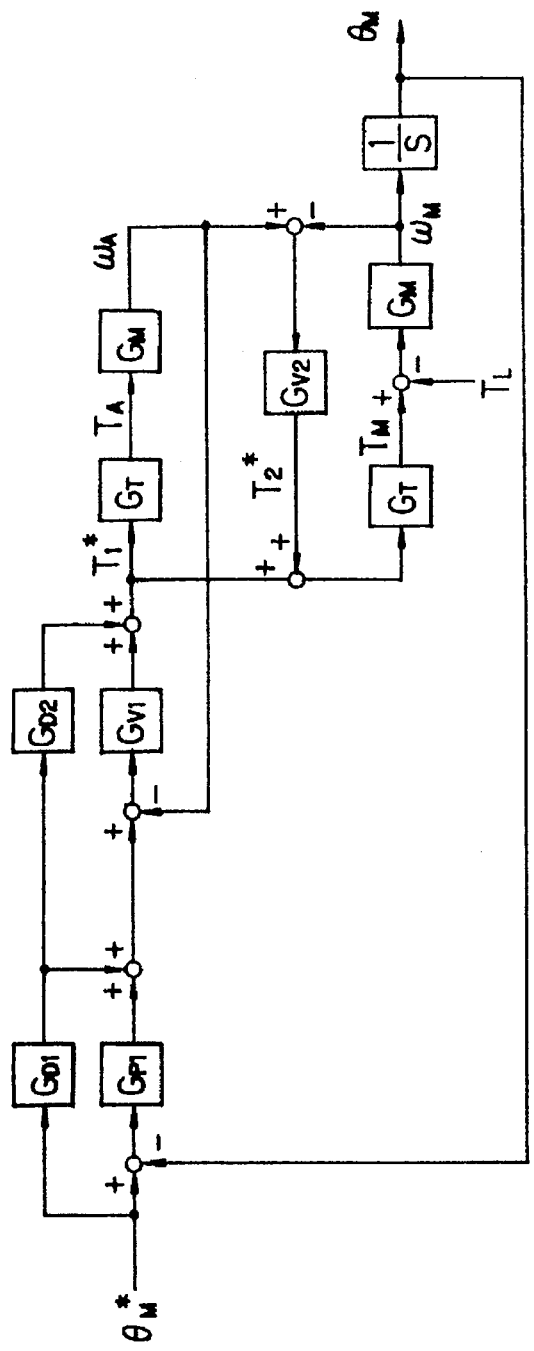
FIGS. 24A and 24B are block diagrams showing operations in Embodiment 6.
Figure 24B:
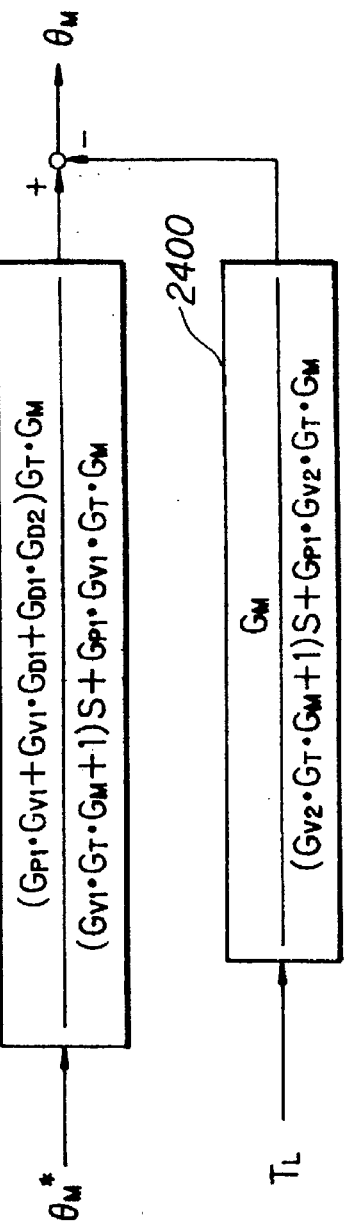
Figure 25:
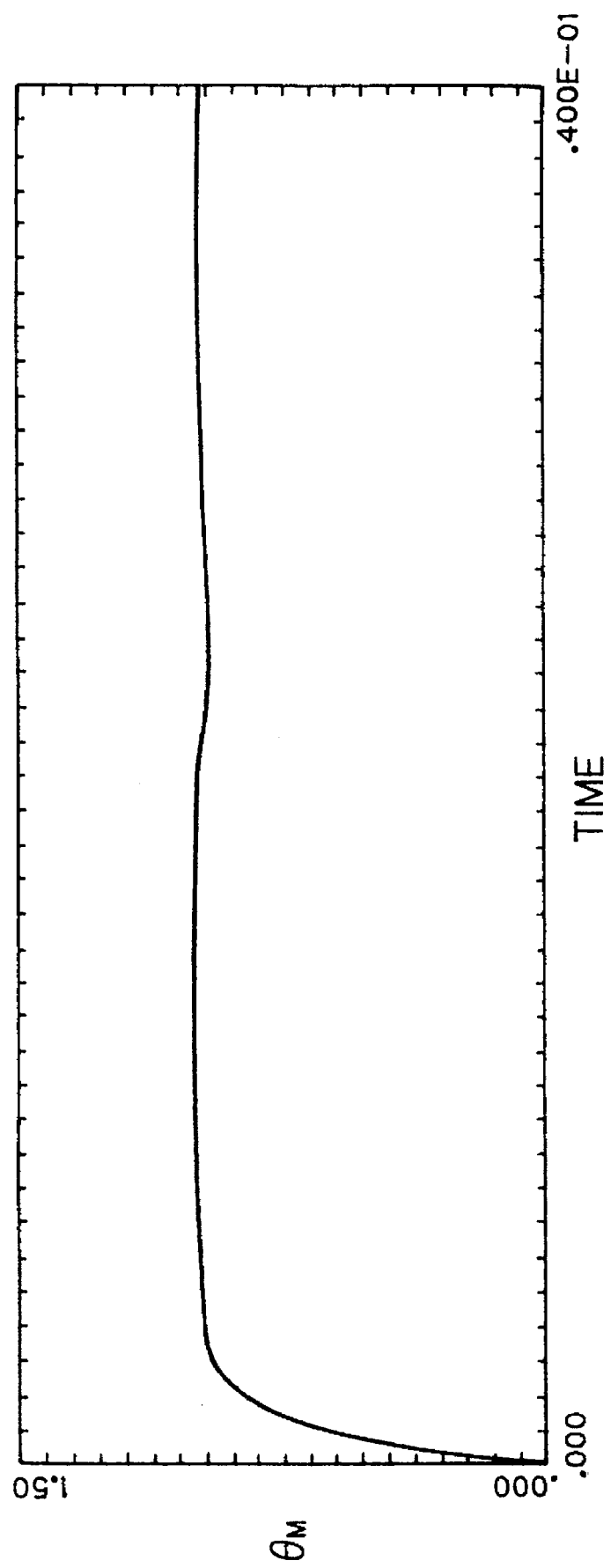
FIG. 25 is a graph showing a result of simulation in Embodiment 6.

Next a description will be provided of Embodiment 6 with reference to FIG. 23 to FIG. 25. In these figures, components having the same reference numeral assigned thereto are the same. FIG. 23 is a block diagram showing the configuration of a controller for an electric motor according to Embodiment 6. In this figure, the second differential circuit 18 differentiates an output from the differential circuit 17 and outputs a second differential signal. Other elements are the same as those in Embodiment 3 shown in FIG. 11, and a further detailed description thereof is omitted.

Next a description will be provided of operational characteristics in the embodiment shown in FIG. 23 with reference to FIGS. 24A and 24B. FIG. 24A is a block diagram showing a position control system in a case where the transmittance for each block in FIG. 23 is set as in Embodiment 3 shown in FIG. 13.

Figure 40A:
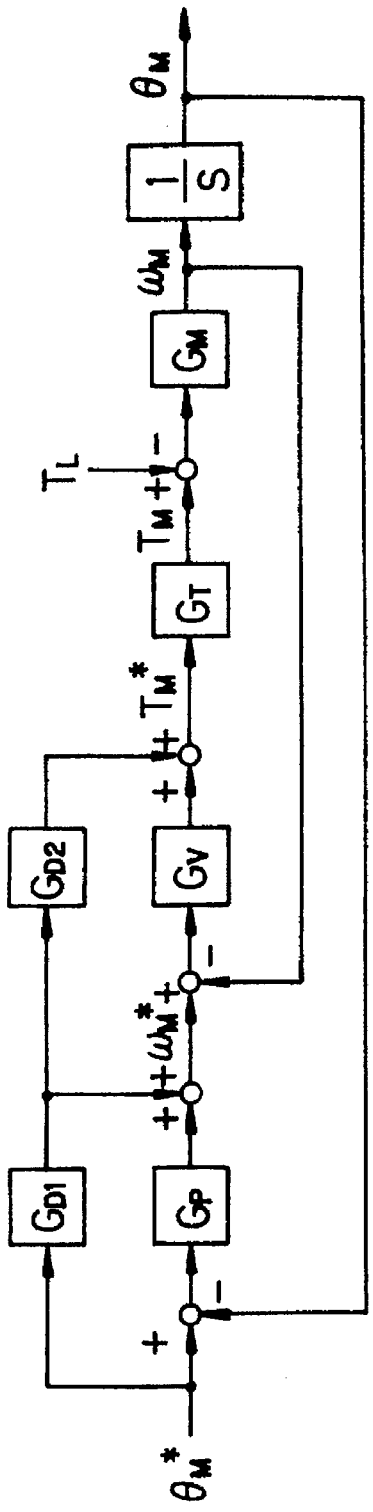
FIGS. 40A and 40B are block diagrams showing operations of a conventional position control unit for an electric motor.
Figure 40B:
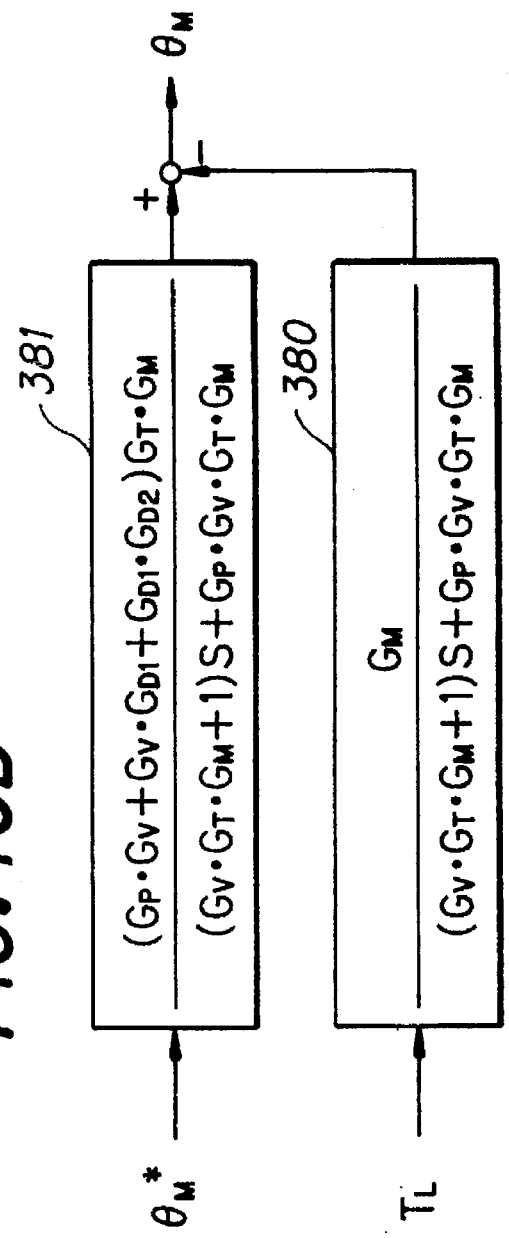
Figure 41:
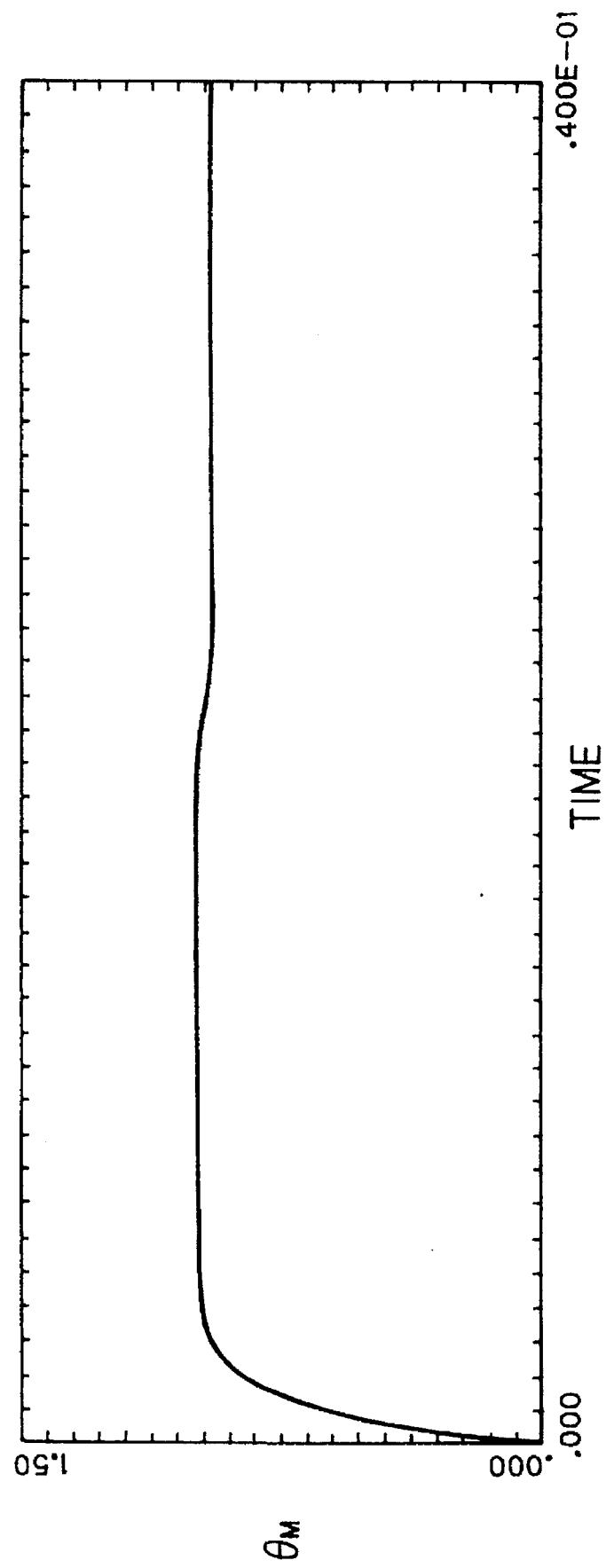
FIG. 41 is a graph showing a result of simulation of a conventional position control unit.
Figure 42:
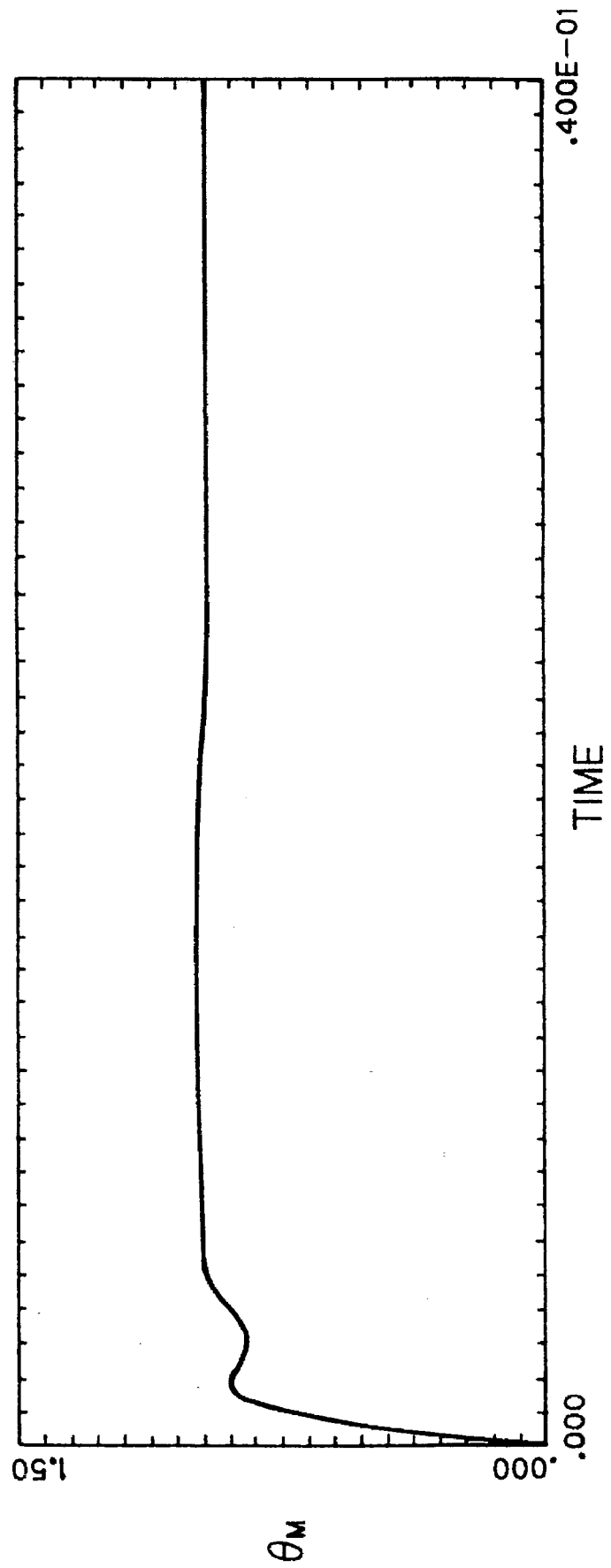
FIG. 42 is a graph showing a result of simulation of a conventional position control unit.
Figure 43:
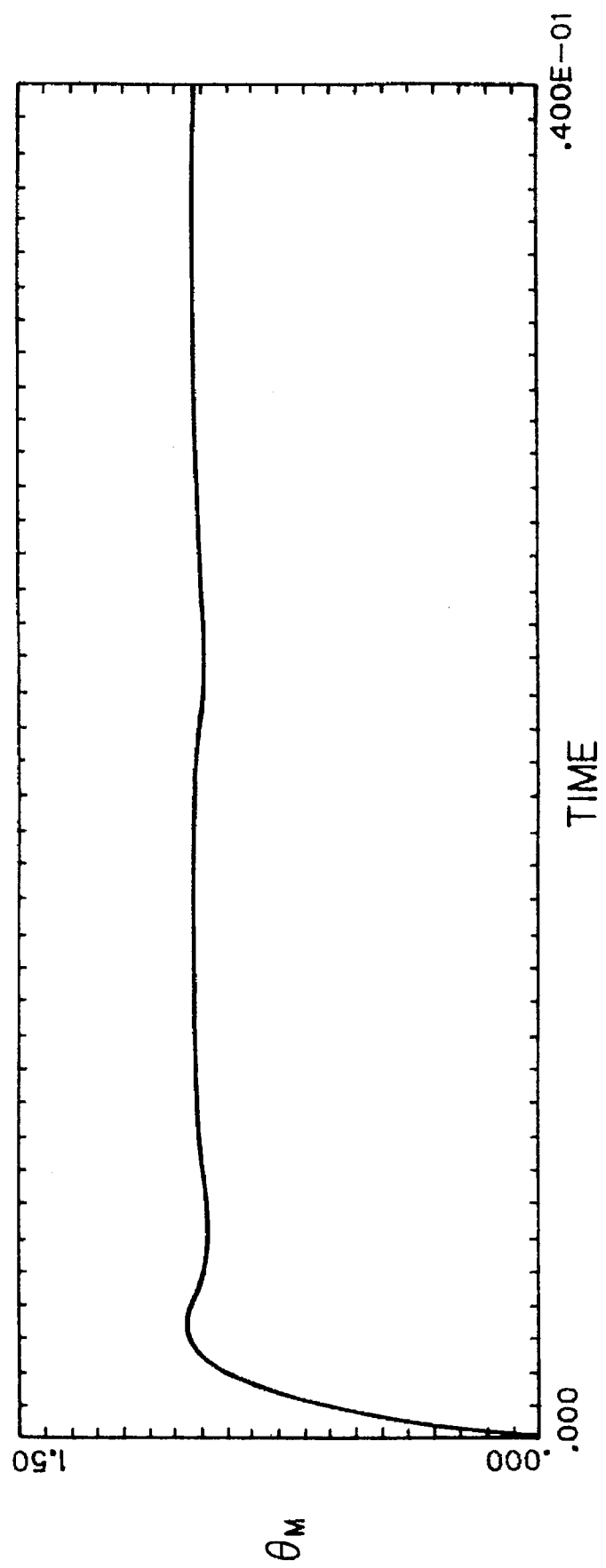
FIG. 43 is a graph showing a result of simulation of a conventional position control unit.

FIG. 24B is a block diagram prepared by redrawing that shown in FIG. 24A and expressed with a transmittance block 2401 to a positional instruction $\omega_M^*$ and a transmittance block 2400 to an external disturbance torque $T_L$ each separated from the other. As for the target response, as the transmittance block 2401 shown in FIG. 24B is the same as the transmittance block 381 shown in FIG. 40 showing a conventional position controller for an electric motor, it is required only to design $G_{P1}$, $G_{V1}$ for insuring a stable polar arrangement and also to design $G_{D1}$ and $G_{D2}$ so that poles having a slow response will be offset at zero points.

As for the external disturbance response, as the transmittance block 2400 shown in FIG. 24B is the same as the transmittance block 1300 in Embodiment 3 shown in FIG. 13B, it is possible to improve the external disturbance response without affecting the target value response by adjusting $G_{V2}$. For this reason, comparison of the controller for an electric motor in Embodiment 6 to the conventional position controller for an electric motor shows that the target value responses are equivalent in both cases, but, as far as the external disturbance is concerned, the former is superior to the latter, and a response equivalent to that in Embodiment 3 shown in FIG. 11 is insured.

What is described above can be verified below by means of simulation. FIG. 25 shows a result of simulation in a case where J is set to 1 and $\omega_{CC}$ to 2000, a positional instruction with a scale of 1 is applied as a step, and a step external disturbance torque with a scale of $2 \times 10^4$ is applied from the middle of the graph. The various gains are set as follows: $K_{P1}$ to 500, $K_{V1}$ to 1000, $\alpha_{P1}$ to 0.5, $\alpha_{V1}$ to 1, $K_{V2}$ to 1000, and $K_{I2}$ to $2 \times 10^5$. From FIG. 25, the characteristics in Embodiment 1 described above can be verified.

Embodiment 7

Figure 26:
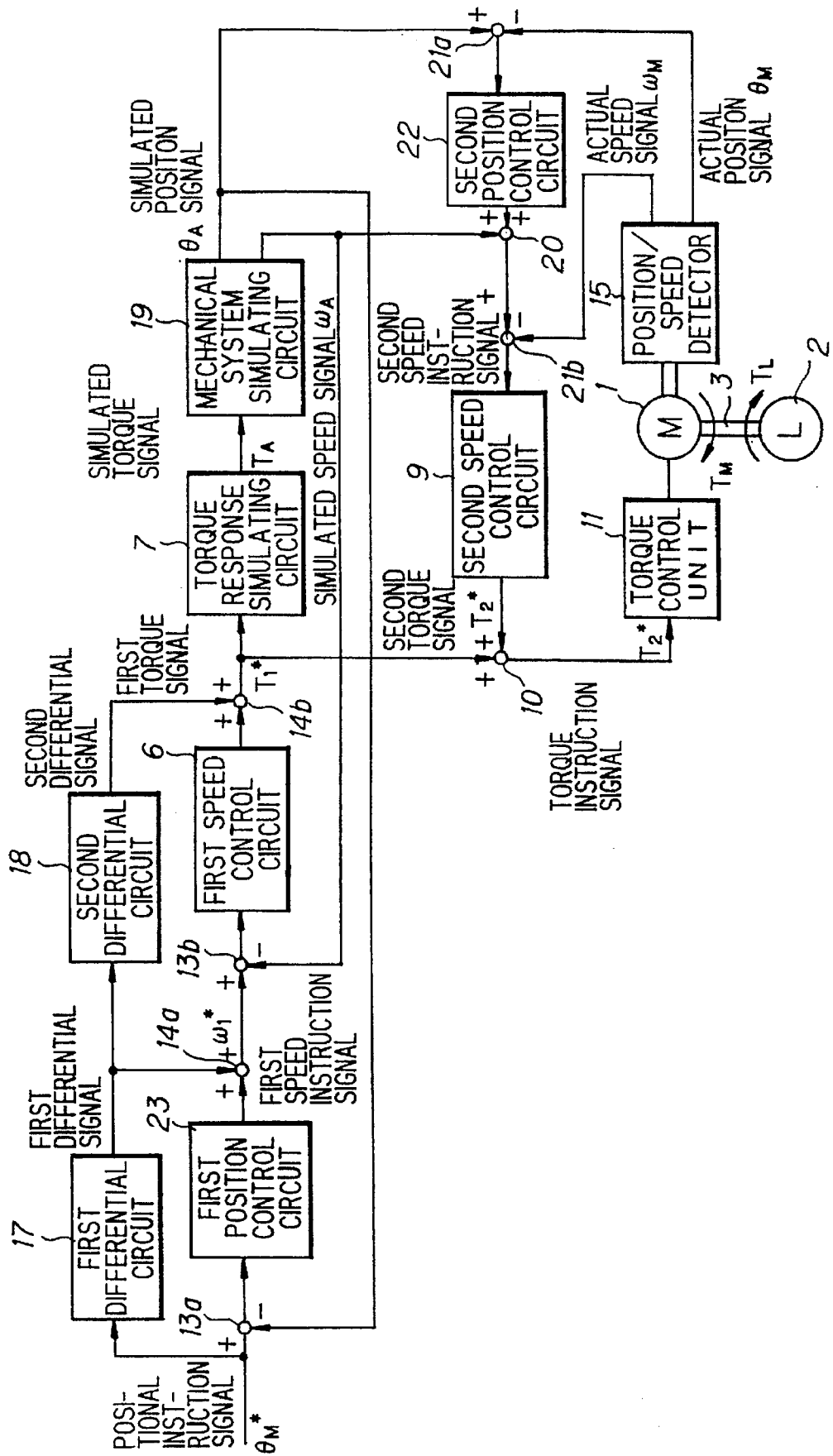
FIG. 26 is a block diagram showing the configuration of a controller for an electric motor according to Embodiment 7.
Figure 28:
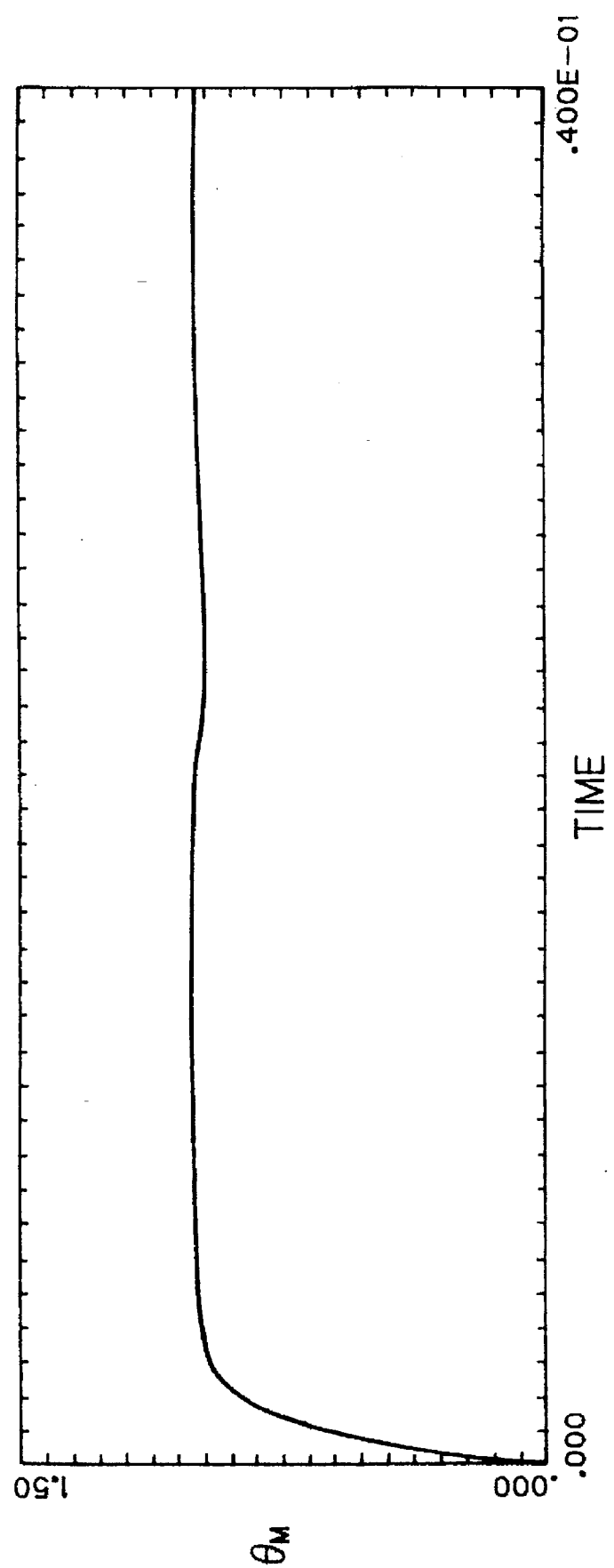
FIG. 28 is a graph showing a result of simulation in Embodiment 7.

Next a description will be provided of Embodiment 7 with reference to FIG. 26 to FIG. 28. In these figures, components each having the same reference numeral assigned thereto are the same. FIG. 26 is a block diagram showing the configuration of a controller for an electric motor according to Embodiment 7. In this figure, the second differential circuit 18 differentiates an output from the first differential circuit 17 and outputs a second differential signal. Other elements are the same as those in Embodiment 5 shown in FIG. 18, and hence a further description thereof is omitted.

Next, a description will be provided of the operational characteristics in Embodiment 7 with reference to FIG. 27A 27B and FIG. 28. FIG. 27A is a block diagram of a position control system in a case where the transmittance for each block in FIG. 26 is set as shown in FIG. 19 relating to Embodiment 5 above.

FIG. 27B is a block diagram prepared by redrawing that shown in FIG. 27A and expressed with the transmittance block 2710 to a positional instruction $\theta_M^*$ and the transmittance block 2700 to an external disturbance torque $T_L$ separated from each other. As the transmittance block 2710 shown in FIG. 27B is the same as the transmittance 2401 showing Embodiment 6 above in FIG. 24B, for the target value response, it is required to design $G_{P1}$ and $G_{V1}$ for a stable polar arrangement and then to design $G_{D1}$ and $G_{D2}$ so that poles having a slow response are offset at a zero point.

As for the external disturbance, as the transmittance block 2700 shown in FIG. 27B is the same as the transmittance block 2100 shown in Embodiment 5 shown in FIG. 21B, it is possible to improve the external response without affecting the target value response by adjusting $G_{V2}$ and $G_{P2}$. For this reason, the controller for an electric motor according to Embodiment 7 has both the advantages of Embodiment 6 and those of Embodiment 5, and with this controller it is possible to realize a target value response equivalent to that of Embodiment 6 and the external disturbance response equivalent to that of Embodiment 5.

What is described above can be verified by means of simulation. FIG. 28 shows a result of simulation in a case where J is set to 1 and $\omega_{CC}$ to 2000, a positional instruction with a scale of 1 is applied as step, and a step external disturbance torque with a scale of $2 \times 10^4$ is applied from the middle of the graph. The various gains are set as follows: $\alpha_{P1}$ to 0.5, $\alpha_{V1}$ to 1, $K_{P1}$ to 500, $K_{V1}$ to 1000, $K_{I1}$ to 0, $K_{P2}$ to 500, and $K_{V2}$ to 1000, $K'_{I2}$ to $2 \times 10^5$. From FIG. 28, the characteristics of Embodiment 1 described above can be verified.

It should be noted that, in Embodiments 1 to 7 above, the mechanical system simulating circuits 19 and 8 shown in FIG. 4 or FIG. 20 are embodiments expressed as a case where a mechanical system including the electric motor 1, torque transfer mechanism 3, and load machine 2 is expressed as a sum of inertia values summed from those for each of the components above. If the rigidity of the torque transfer mechanism 3 is low and the mechanical system must be treated as a two-inertia system including the electric motor 1 and load machine 2, suitable embodiments of the mechanical system simulating circuits 19 and 8 are shown in FIG. 29 and FIG. 30.

Figure 29:
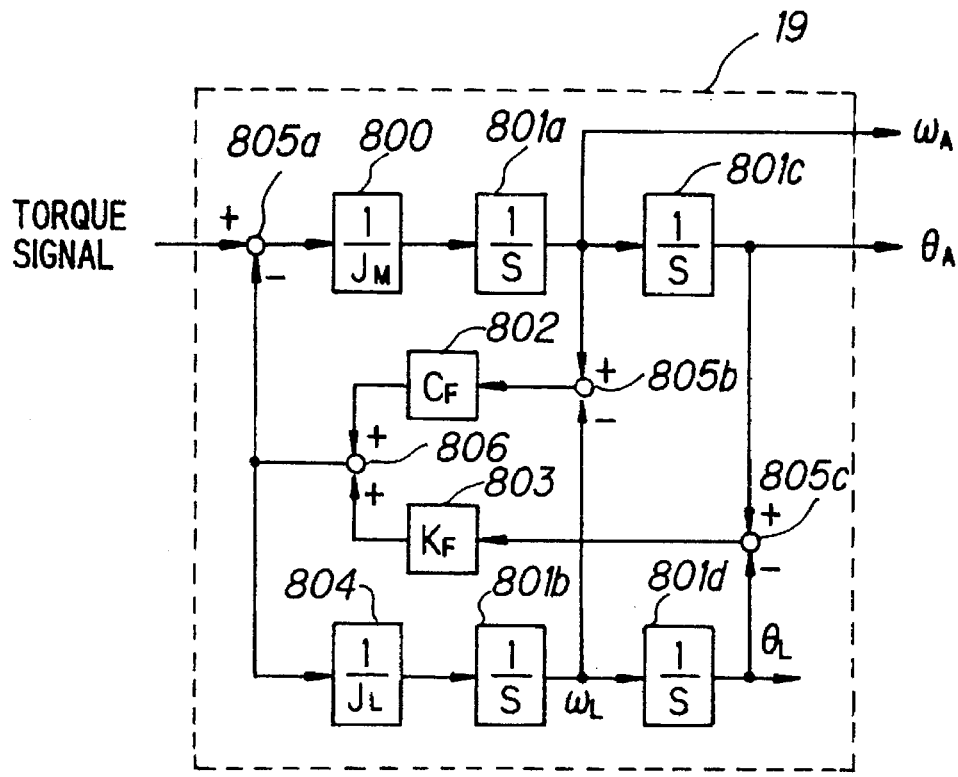
FIG. 29 is a block diagram showing another configuration of the mechanical system simulating circuit shown in FIG. 20.
Figure 30:
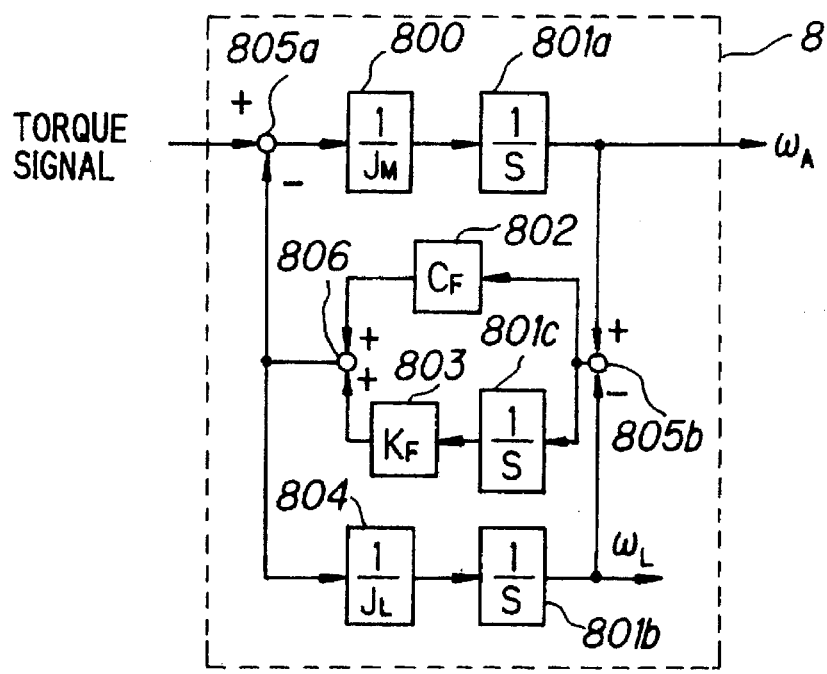
FIG. 30 is a block diagram showing another configuration of the mechanical system simulating circuit shown in FIG. 4.

In FIG. 29, designated at reference numeral 800 is a coefficient multiplier having a gain which is the inverse of the inertia value $J_M$ shown in FIG. 1, at 801a, 801b, 801c, and 801d each an integrator, at 802 a coefficient multiplier having a gain which is equal to the coefficient $C_P$ of the torque transfer mechanism 3, at 803 a coefficient multiplier having again which is a rigidity value $K_F$ of the torque transfer mechanism 3, at 804 a coefficient multiplier having a gain which is the inverse of the inertia value $J_L$ of the load machine 2, at 805a, 805b, and 805c each a subtracter, and at 806 an adder.

By summing a signal obtained by multiplying the error between a simulated speed signal $\omega_A$ indicating the rotational speed of the electric motor 1 and a simulated load speed signal $\omega_L$ indicating the speed of the load machine 2 by $C_F$ in the coefficient multiplier 802 and a signal obtained by multiplying an error between a simulated positional signal $\theta_A$ indicating a position of the electric motor 1 and a simulated load position signal $\theta_L$ indicating the position of the load by $K_F$ in the coefficient multiplier 803, simulated axial torque $T_F$ equivalent to the axial torque of the transfer mechanism 3 can be obtained.

Then, from a signal indicating the difference between the inputted torque signal T* and simulated axial torque signal $T_F$, a simulated speed signal $\omega_A$ and simulated position signal $\theta_A$ are obtained by the coefficient multiplier 800, integrators 801a and 801c. Depending on the simulated axial torque $T_F$, a simulated load speed signal $\omega_L$ and a simulated load position signal $\theta_L$ are obtained by the coefficient multiplier 804 and integrators 801b, 801d. Operations in FIG. 30 are the same as those described above, and thus a further description is omitted.

Embodiment 8

Figure 31:
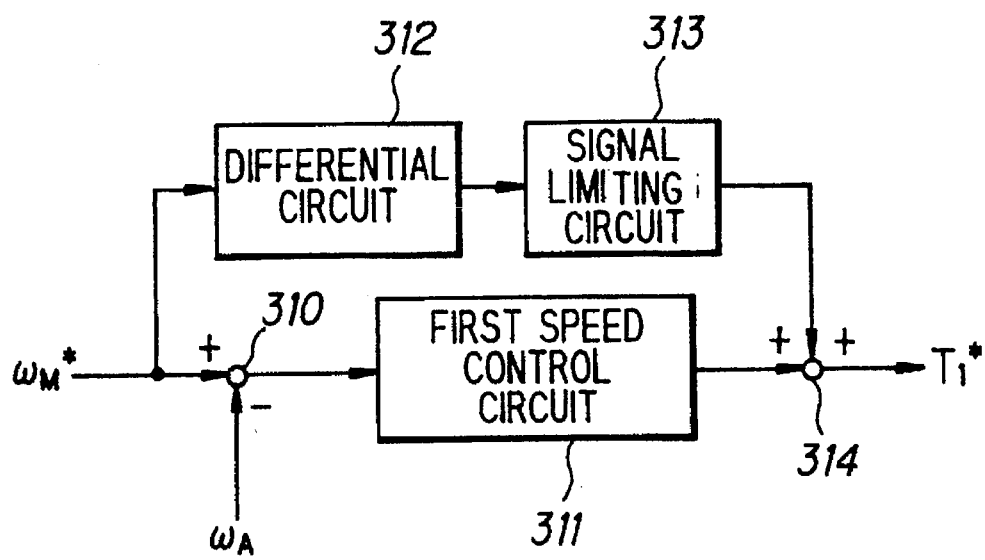
FIG. 31 is a block diagram showing the configuration of a controller for an electric motor according to Embodiment 8.

Next, a description will be provided of Embodiment 8 with reference to FIG. 31. In FIG. 31, designated at reference numeral 310 is a subtracter for outputting an error between the speed instruction signal $\omega_M$* and the simulated speed signal $\omega_A$, at 311 a first speed control circuit for outputting a control signal for reducing the error, at 312 a differential circuit for differentiating the speed instruction signal $\omega_M$* and outputting a differential signal, at 313 a signal limiting circuit for limiting a differential signal to under a specified amplitude value, at 314 an adder for summing an output signal from the signal limiting circuit 313 and an output signal from the first speed control circuit 311 and outputting a first torque signal $T_I$*. Reference numeral 314 indicates an adder for summing an output signal from the signal limiting circuit 313 and an output signal from the first speed control circuit 311 and outputting a first torque signal $T_I$*.

Assuming that the input signal to the signal limiting circuit is X and the output signal therefrom is Y, and that furthermore a positive maximum amplitude value and a negative amplitude value allowable for an input X are $X_{max}$ and $X_{min}$, operations of the signal limiting circuit 313 are as indicated by expression (25):

$$X > X_{max} \qquad Y = X_{max} \qquad (25)$$
$$X_{min} \leq X \leq X_{max} \qquad Y = X$$
$$X < X_{min} \qquad Y = X_{min}$$

$X_{max}$, $X_{min}$ may be set to values relating to a speed allowable for a mechanical system comprising the electric motor 1, torque transfer mechanism 3 and load machine 2. Also operations as indicated by expression (25) can be realized, as well known, by a limiter circuit using an operating amplifier and a diode or the like, or by software for a microcomputer.

When constructed as described above, a speed instruction signal $\omega_M$* having a large amplitude value is inputted, and even a differential signal at an excessive level is outputted from a differential circuit, the first torque signal $T_1$* is held at an appropriate level, so that it is possible to obtain a controller for an electric motor which does not give any damage to machine by allowing an electric motor to generate an excessive torque. Furthermore, when this Embodiment 8 is applied to Embodiment 6 and Embodiment 7 described above, only an input signal to the differential circuit 312 is changed from the speed instruction signal $\omega_M$* to an output signal from a differential circuit in the previous stage, so that the same effect can be achieved. It should be noted that Embodiment 8 is applicable to Embodiments 1 to 7.

Embodiment 9

Figure 32:
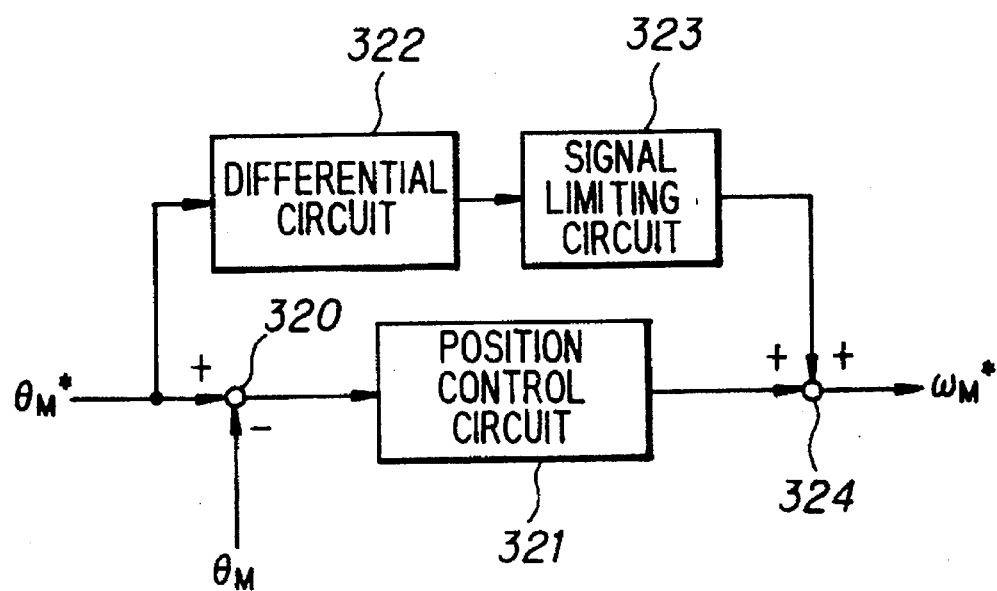
FIG. 32 is a block diagram showing the configuration of a controller for an electric motor according to Embodiment 9.

Next, a description will be provided of Embodiment 9 with reference to FIG. 32. In FIG. 32, designated at reference numeral 320 is a subtracter, at 321 a position control circuit, at 322 a differential circuit, at 323 a signal limit circuit, and at 324 an adder. The operations are the same as those in the embodiment shown in FIG. 31, so that a further description is omitted herein. Operations of the signal limiting circuit 323 are as indicated by expression (25); and it is required only to set $X_{max}$ and $X_{min}$ to values related to an allowable torque for the mechanical system including the electric motor 1, torque transfer mechanism 3 and load machine 2.

When constructed as described above, even if a positional instruction signal $\theta_M$* having a large amplitude value is inputted and a differential signal is at an excessive level, as the speed instruction signal is limited to an appropriate level, it is possible to provide a controller for an electric motor which can prevent the rotational speed of the electric motor from exceeding an excessive level, thus preventing damage to the load machine.

It should be noted that, although the descriptions of Embodiments 1 to 7 above assume that the torque response simulating circuit 7 simulates a primary delay factor expressed by expression (1) above, the same effect can be achieved also with the lag time factor as expressed by expression (26).

$$G_T = e^{-s/\omega_{CC}} \qquad (26)$$

The descriptions of Embodiments 1 to 9 above assume that the electric motor 1 generates torque through rotation, but the present invention can similarly be applied to an electric motor such as a linear motor which generates a thrust.

Expression (27) below is an operational expression in a case when the torque response simulating circuit 7 shown in FIG. 3 is realized by software. It should be noted that $T_{S1}$ is a sampling time. (k) and (k−1) indicate the k-th sample and (k−1)st sample respectively.

$$T_A(k)=T_A(k-1)+T_{S1}\cdot\omega_{CC}\cdot(T_1^*(k-1)-T_A(k-1)) \quad (27)$$

Expressions (28) and (29) below are operational expressions for a case where the mechanical system simulating circuit 19 shown in FIG. 20 is realized with software. It should be noted that TS2 is a sampling time and T is a torque signal.

$$\omega_A(k)=\omega_A(k-1)+T_{S2}\cdot T(k-1)/J \quad (28)$$

$$\theta_A(k)=\theta_A(k-1)+T_{S2}\cdot\omega_A(k-1) \quad (29)$$

Also the mechanical system simulating circuit 8 shown in FIG. 4 has the same construction as that shown in FIG. 20, so that it can be realized with software.

Expressions (30) to (32) below are operational expressions for a case where a circuit comprising the differential circuit 5 and the first speed control circuit 6 each shown in FIG. 5 is realized with software. It should be noted that $T_{S3}$ is a sampling time, $d_1$ is an output from the differentiator 50, and $i_1$ is an output from the integrator 62.

$$d_1(k)=(\omega_M^*(k)-\omega_M^*(k-1))/T_{S3} \quad (30)$$

$$i_1(k)=i_1(k-1)+T_{S3}\cdot K_{I1}\cdot(\omega_M^*(k-1)-\omega_A(k-1)) \quad (31)$$

$$T_1^*(k)=\alpha_{V1}\cdot d_1(k)+K_{V1}\cdot(\omega_M^*(k)-\omega_A(k))+i_1(k) \quad (32)$$

The second speed control circuit 9 shown in FIG. 6 has the same construction as that of the first speed control circuit 6 shown in FIG. 5, so that it can easily be realized with software.

Expressions (33) and (34) are operational expressions for a case where a circuit composed of the first differential circuit 17 shown in FIG. 12 and the first position control circuit 16 is realized with software. It should be noted that $T_{S4}$ is a sampling time and $d_2$ is an output from the differentiator 170.

$$d_2(k)=(\theta_M^*(k)-\theta_M^*(k-1))/T_{S4} \quad (33)$$

$$\omega_M^*=\alpha_{P1}\cdot d_2(k)+K_{P1}\cdot(\theta_M^*(k)-\theta_M(k)) \quad (34)$$

Also the second position control circuit 22 shown in FIG. 19 has the same construction as the first control circuit 16 shown in FIG. 12, so that it can be realized with software.

It should be noted that Embodiment 8 is applicable to Embodiments 1 to 7 as well.

As described above, with the controller for an electric motor according to the present invention, the target value response can be set with a differential circuit and a first speed control means, and also the external disturbance response can independently be set with a second speed control means, so that the target value response can be improved and at the same time the external disturbance response can be improved without deteriorating the target value response.

With the controller for an electric motor according to the present invention, the target value response can be set with first and second differential circuits, a position control circuit, and a first speed control circuit, and the external disturbance response can independently be set with a second speed control circuit, so that the target value response can be improved and at the same time the external disturbance response can be improved without deteriorating the target value response.

With the controller for an electric motor according to the present invention, the target value response can be set with first and second differential circuits, a position control circuit, and a first speed control circuit, and the external disturbance can be independently be set with a second position control circuit and a second speed control circuit, so that the target value response can be improved and at the same time the external disturbance response can be improved without deteriorating the target value response.

With the controller for an electric motor according to the present invention, the target value response can be set with first and second differential circuits, a position control circuit, and a first speed control circuit, and the external disturbance response can independently be set with a second speed control circuit, so that the target value response can be improved and at the same time the external disturbance response can be improved without deteriorating the target value response.

With the controller for an electric motor according to the present invention, an output from a differential circuit for differentiating a speed instruction signal with a signal limiting circuit is limited to below a specified amplitude value, so that a torque instruction signal is limited to an appropriate level, generation of excessive torque can be prevented, and no damage is caused to the load machine.

With the controller for an electric motor according to the present invention, an output from a differential circuit for differentiating a positional instruction signal with a signal limiting circuit is limited to below a specified amplitude value, so that a speed instruction signal is limited to an appropriate level, operation at an excessive speed can be prevented, and damage to the load machine is prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A controller for an electric motor comprising:
    an electric motor for driving a load machine via a torque transfer mechanism;
    a speed detecting means for detecting a rotational speed of said electric motor and outputting an actual speed signal;
    a response simulating means for simulating a transmittance from an input of a torque control unit to a speed of said electric motor and outputting a simulated speed signal according to a first torque signal;
    a differential means for differentiating a speed instruction signal and outputting a differential signal;
    a first speed control means for outputting a signal according to said speed instruction signal and a simulated speed signal from said response simulating means;
    a first adding means for summing a differential signal from said differential means and an output signal from said first speed control means and outputting a first torque signal;
    a second speed control means for outputting a second torque signal according to a simulated speed signal from said response simulating means and an actual speed signal from said speed detecting means;
    a second adding means for summing a first torque signal from said first adding means and a second torque signal from said second speed control means and outputting a torque instruction signal; and
    a torque control unit for controlling a torque of said electric motor according to a torque signal from said adding means.

2. A controller for an electric motor according to claim 1, wherein said speed control means comprises signal limiting means for limiting a differential signal inputted thereto under a specified amplitude value.

3. A controller for an electric motor comprising:
an electric motor for driving a load machine via a torque transfer mechanism;
a speed detecting means for detecting a rotational speed of said electric motor and outputting an actual speed signal;
a mechanical system simulating means for simulating a transmittance from a torque of said electric motor to a speed of said electric motor in a mechanical system comprising said electric motor, load machine and torque transfer mechanism and outputting a first simulated speed signal according to a first torque signal;
a torque response simulating means for simulating response delay characteristics from an input of a torque control unit to a generated torque of said electric motor and outputting a second simulated speed signal according to a first simulated speed signal from said mechanical system simulating means;
a differential means for differentiating a speed instruction signal and outputting a differential signal;
a first speed control means for outputting a signal according to said speed instruction signal and a first simulated speed signal from said mechanical system simulating means;
a first adding means for summing an output signal from said first speed control means and a differential signal from said differential means and outputting a first torque signal;
a second speed control means for outputting a second torque signal according to a second simulated speed signal from said torque response simulating means and an actual speed signal from said speed detecting means;
a second adding means for summing a first torque signal from said first adding means and a second torque signal from said second control means and outputting a torque instruction signal; and
a torque control unit for controlling a torque of said electric motor according to a torque instruction signal from said second adding means.

4. A controller for an electric motor according to claim 3, wherein said speed control means has a signal limiting means for limiting a differential signal inputted thereto under a specified amplitude value.

5. A controller for an electric motor comprising:
an electric motor for driving a load machine through a torque transfer mechanism;
a position/speed detecting means for detecting a rotational speed and a position of said electric motor and outputting an actual speed signal and an actual position signal;
a response simulating means for simulating a transmittance from an input of a torque control unit to a speed of said electric motor and outputting a simulated speed signal according to a first torque signal;
a first differential means for differentiating a positional instruction signal and outputting a first differential signal;
a positional control means for outputting a signal according to said positional instruction signal and an actual position signal from said position/speed detecting means;
a first adding means for summing a first differential signal from said first differential means and an output signal from said position control means and outputting a speed instruction signal;
a second differential means for differentiating a speed instruction signal from said first adding means and outputting a second differential signal;
a first speed control means for outputting a signal according to a speed instruction signal from said first adding means and a simulated speed signal from said response simulating means;
a second adding means for summing a second differential signal from said second differential means and an output signal from said first speed control means and outputting a first torque signal;
a second speed control means for outputting a second torque signal according to a simulated speed signal from said response simulating means and an actual speed signal from said position/speed detecting means;
a third adding means for summing a first torque signal from said adding means and a second torque signal from said second speed control means and outputting a torque instruction signal; and
a torque control unit for controlling a torque of said electric motor according to a torque instruction signal from said third adding means.

6. A controller for an electric motor according to claim 5, wherein said speed control means comprises a signal limiting means for limiting a differential signal inputted thereto under a specified amplitude value.

7. A controller for an electric motor according to claim 5, wherein said position control means comprises a signal limiting means for limiting a differential signal inputted thereto under a specified amplitude value.

8. A controller for an electric motor comprising:
an electric motor for driving a load machine through a torque transfer mechanism;
a position/speed detecting means for detecting a rotational speed and a position of said electric motor and outputting an actual speed signal and an actual position signal;
a mechanical system simulating means for simulating a transmittance from a torque of said electric motor to a speed of said electric motor in a mechanical system comprising said electric motor, load mechanism and torque transfer mechanism and outputting a first simulated speed signal according to the first torque signal;
a torque response simulating means for simulating response delay characteristics from an input of a torque control unit to a generated torque in said electric motor and outputting a second simulated speed signal according to a first simulated speed signal from said mechanical system simulating means;
a first differential means for differentiating a positional instruction signal and outputting a first differential signal;
a position control means for outputting a signal according to said positional instruction signal and an actual position signal from said position/speed detecting means;
a first adding means for summing an output signal from said position control means and a first differential signal from said first differential means and outputting a speed instruction signal;
a second differential means for differentiating a speed instruction signal from said first adding means and outputting a second differential signal;

a first speed control means for outputting a signal according to a speed instruction signal from said first adding means and a simulated speed signal from said mechanical system simulating means;

a second adding means for summing an output signal from said first speed control means and a second differential signal from said second differential means and outputting a first torque signal;

a second speed control means for outputting a second torque signal according to a second simulated speed signal from said torque response simulating means and an actual speed signal from said position/speed detecting means;

a third adding means for summing a first torque signal from said second adding means and a second torque signal from said second speed control means and outputting a torque instruction signal; and a torque control unit for controlling a torque of said electric motor according to a torque instruction signal from said third adding means.

9. A controller for an electric motor according to claim 8, wherein said speed control means has a signal limiting means for limiting a differential signal inputted thereto under a specified amplitude value.

10. A controller for an electric motor according to claim 8, wherein said position control means comprises a signal limiting means for limiting a differential signal inputted thereto under a specified amplitude value.

11. A controller for an electric motor comprising:

an electric motor for driving a load machine through a torque transfer mechanism;

a position/speed detecting means for detecting a rotational speed and a position of said electric motor and outputting an actual speed signal and an actual position signal;

a response simulating means for simulating a transmittance from an input of a torque control unit to a speed and a position of said electric motor and outputting a simulated speed signal and a simulated position signal according to a first torque signal;

a first differential means for differentiating a positional instruction signal and outputting a first differential signal;

a first position control means for outputting a signal according to said positional instruction signal and a simulated position signal from said response simulating means;

a first adding means for summing an output signal from said first position control means and a first differential signal from said differential means and outputting a first speed instruction signal;

a second differential means for differentiating a first speed instruction signal from said first adding means and outputting a second differential signal;

a first speed control means for outputting a first speed instruction signal from said first adding means and a simulated speed signal from said response simulating means;

a second adding means for summing an output signal from said first speed control means and a second differential signal from said second differential means and outputting a first torque signal;

a second position control means for outputting a signal from a simulated position signal from said response simulating means and an actual position signal from said position/speed detecting means;

a third adding means for summing an output signal from said second position control means and a simulated speed signal from said response simulating means and outputting a second speed instruction signal;

a second speed control means for outputting a second torque signal according to a second speed instruction signal from said third adding means and an actual speed signal from said position/speed detecting means;

a fourth adding means for summing a first torque signal from said second adding means and a second torque signal from said second speed control means and outputting a torque instruction signal; and a torque control unit for controlling a torque of said electric motor according to a torque instruction signal from said fourth adding means.

12. A controller for an electric motor according to claim 11, wherein said speed control means comprises a signal limiting means for limiting a differential signal inputted thereto under a specified amplitude value.

13. A controller for an electric motor according to claim 11, wherein said position control means comprises a signal limiting means for limiting a differential signal inputted thereto under a specified amplitude value.

14. A controller for an electric motor comprising:

an electric motor for driving a load machine through a torque transfer mechanism;

a position/speed detecting means for detecting a rotational speed and a position of said electric motor and outputting an actual speed signal as well as an actual position signal;

a response simulating means for simulating a transmittance from an input to a torque control unit to a speed of said electric motor and outputting a simulated speed signal according to a first torque signal;

a first differential means for differentiating a positional instruction signal and outputting a first differential signal;

a position control means for outputting a signal according to said positional instruction signal and an actual position signal from said position/speed detecting means;

a first adding means for summing an output signal from said position control means and a first differential signal from said first differential means and outputting a speed instruction signal;

a second differential means for differentiating a first differential signal from said first differential means and outputting a second differential signal;

a first speed control means for outputting a signal according to a speed instruction signal from said first adding means and a simulated speed signal from said response simulating means;

a second adding means for summing an output signal from said first speed control means and a second differential signal from said second differential means and outputting a torque signal;

a second speed control means for outputting a second torque signal according to a simulated speed signal from said response simulating means and an actual speed signal from said position/speed detecting means;

a third adding means for summing a second torque signal from said second speed control means and a first torque signal from said second adding means and outputting a torque instruction signal; and a torque control unit for controlling a torque of said electric motor according to a torque instruction signal from said third adding means.

15. A controller for an electric motor according to claim 14, wherein said speed control means comprises a signal limiting means for limiting a differential signal inputted thereto under a specified amplitude value.

16. A controller for an electric motor according to claim 14, wherein said position control means comprises a signal limiting means for limiting a differential signal inputted thereto under a specified amplitude value.

17. A controller for an electric motor comprising:

an electric motor for driving a load machine through a torque transfer mechanism;

a position/speed detecting means for detecting a rotational speed and a position of said electric motor and outputting an actual speed signal as well as an actual position signal;

a response simulating means for simulating a transmittance from an input from a torque control unit to a speed and a position of said electric motor and outputting a simulated speed signal and a simulated position signal according to a first torque signal;

a first differential means for differentiating a positional instruction signal and outputting a first differential signal;

a first position control means for outputting a signal according to said positional instruction signal and a simulated position signal from said response simulating means;

a first adding means for summing an output signal from said first position control means and a first differential signal from said differential means and outputting a first speed instruction signal;

a second differential means for differentiating a first differential signal from said first differential means and outputting a second differential signal;

a first speed control means for outputting a first speed instruction signal from said first adding means and a simulated speed signal from said response simulating means;

a second adding means for summing an output signal from said first speed control means and a second differential signal from said second differential means and outputting a first torque signal;

a second position control means for outputting a signal from a simulated position signal from said response simulating means and an actual position signal from said position/speed detecting means;

a third adding means for summing an output signal from said second position control means and a simulated speed signal from said response simulating means and outputting a second speed instruction signal;

a second speed control means for outputting a second torque signal according to a second speed instruction signal from said third adding means and an actual speed signal from said position/speed detecting means;

a fourth adding means for summing a first torque signal from said second adding means and a second torque signal from said second speed control means; and a torque control unit for controlling a torque of said electric motor according to a torque instruction signal from said fourth adding means.

18. A controller for an electric motor according to claim 17, wherein said speed control means comprises a signal limiting means for limiting a differential signal inputted thereto under a specified amplitude value.

19. A controller for an electric motor according to claim 17, wherein said position control means comprises a signal limiting means for limiting a differential signal inputted thereto under a specified amplitude value.

* * * * *